United States Patent
Ramani et al.

(10) Patent No.: US 12,444,315 B2
(45) Date of Patent: Oct. 14, 2025

(54) VISUALIZING CAUSALITY IN MIXED REALITY FOR MANUAL TASK LEARNING

(71) Applicant: Purdue Research Foundation, West Lafayette, IN (US)

(72) Inventors: Karthik Ramani, West Lafayette, IN (US); Jingyu Shi, West Lafayette, IN (US); Rahul Jain, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 18/492,156

(22) Filed: Oct. 23, 2023

(65) Prior Publication Data

US 2024/0135831 A1   Apr. 25, 2024
US 2024/0233563 A9   Jul. 11, 2024

Related U.S. Application Data

(60) Provisional application No. 63/479,810, filed on Jan. 13, 2023, provisional application No. 63/418,609, filed on Oct. 23, 2022.

(51) Int. Cl.
*G09B 5/00* (2006.01)
*G06F 3/01* (2006.01)
(Continued)

(52) U.S. Cl.
CPC ............. *G09B 5/02* (2013.01); *G06F 3/011* (2013.01); *G06T 19/006* (2013.01); *G09B 19/003* (2013.01); *G06T 2200/24* (2013.01)

(58) Field of Classification Search
CPC .................................................. G09B 19/003
See application file for complete search history.

(56) References Cited

U.S. PATENT DOCUMENTS

| | | | |
|---|---|---|---|
| 11,017,690 B1* | 5/2021 | Zia | H04N 5/77 |
| 12,039,878 B1* | 7/2024 | Salim | G06N 5/022 |

(Continued)

OTHER PUBLICATIONS

Amaury Peniche, Christian Diaz, Helmuth Trefftz, and Gabriel Paramo. 2012. Combining Virtual and Augmented Reality to Improve the Mechanical Assembly Training Process in Manufacturing. In Proceedings of the 6th WSEAS International Conference on Computer Engineering and Applications, and Proceedings of the 2012 American Conference on Applied Mathematics (Harvard, Cambridge) (American-Math'12/CEA'12). World Scientific and Engineering Academy and Society (WSEAS), Stevens Point, Wisconsin, USA, 292-297.

(Continued)

*Primary Examiner* — Peter R Egloff
(74) *Attorney, Agent, or Firm* — Maginot, Moore & Beck LLP

(57) ABSTRACT

A learning system is disclosed that leverages intention-driven causality to enhance skill learning. The learning system enables an author to easily develop mixed reality (MR) tutorial content for performing a task that advantageously captures causal relationships between steps and, thus, enables such causality to be conveyed to the novice user when learning how to perform the task. To this end, the learning system leverages a novel hierarchical representation of causality and intention alongside a systematic workflow suitable for designing skill learning content. By preserving and presenting causal information to the novice user, the user can better understand not only the steps required to perform a task, but also why each step is performed.

15 Claims, 13 Drawing Sheets

(51) Int. Cl.
  *G06T 19/00* (2011.01)
  *G09B 5/02* (2006.01)
  *G09B 19/00* (2006.01)

(56) References Cited

U.S. PATENT DOCUMENTS

| | | | | |
|---|---|---|---|---|
| 2002/0184070 | A1* | 12/2002 | Chen | G06Q 10/06311 |
| | | | | 705/7.13 |
| 2007/0022073 | A1* | 1/2007 | Gupta | G06N 5/022 |
| | | | | 706/45 |
| 2008/0154935 | A1* | 6/2008 | Draeger | G06F 16/838 |
| | | | | 707/999.102 |
| 2014/0220527 | A1* | 8/2014 | Li | G06V 20/10 |
| | | | | 434/262 |
| 2018/0253900 | A1* | 9/2018 | Finding | G06T 19/006 |
| 2018/0315329 | A1* | 11/2018 | D'Amato | G09B 5/02 |
| 2019/0005833 | A1* | 1/2019 | Das | G09B 19/003 |
| 2019/0114482 | A1* | 4/2019 | Li | G06V 20/10 |
| 2019/0354761 | A1* | 11/2019 | Arshad | G06T 7/70 |
| 2020/0117268 | A1* | 4/2020 | Kritzler | G06T 19/006 |
| 2020/0279205 | A1* | 9/2020 | Gong | G06N 20/20 |
| 2021/0271886 | A1* | 9/2021 | Zheng | G06V 20/46 |
| 2021/0312829 | A1* | 10/2021 | Peterson | G09B 19/003 |
| 2022/0036050 | A1* | 2/2022 | Chandler | G06V 10/82 |
| 2023/0068660 | A1* | 3/2023 | Brent | G06F 9/453 |
| 2023/0080424 | A1* | 3/2023 | Yu | G06N 7/01 |
| | | | | 706/12 |

OTHER PUBLICATIONS

Nils Petersen and Didier Stricker. 2012. Learning task structure from video examples for workflow tracking and authoring. In 2012 IEEE International Symposium on Mixed and Augmented Reality (ISMAR). IEEE, Piscataway, NJ, USA, 237-246.

Stéphanie Philippe, Alexis D Souchet, Petros Lameras, Panagiotis Petridis, Julien Caporal, Gildas Coldeboeuf, and Hadrien Duzan. 2020. Multimodal teaching, learning and training in virtual reality: a review and case study. Virtual Reality & Intelligent Hardware 2, 5 (2020), 421-442.

Kristin Andrews Assistant Professor. 2004. How to learn from our mistakes. Philosophical Explorations 7, 3 (2004), 247-263. https://doi.org/10. 1080/13869790420002583349 arXiv:https://doi.org/10.1080/13869790420002583349.

Xun Qian, Fengming He, Xiyun Hu, Tianyi Wang, Ananya Ipsita, and Karthik Ramani. 2022. ScalAR: Authoring Semantically Adaptive Augmented Reality Experiences in Virtual Reality. In Proceedings of the 2022 CHI Conference on Human Factors in Computing Systems (New Orleans, LA, USA) (CHI '22). Association for Computing Machinery, New York, NY, USA, Article 65, 18 pages. https://doi.org/10.1145/3491102.3517665.

Amir Rasouli, Iuliia Kotseruba, Toni Kunic, and John Tsotsos. 2019. PIE: A Large-Scale Dataset and Models for Pedestrian Intention Estimation and Trajectory Prediction. In 2019 IEEE/CVF International Conference on Computer Vision (ICCV). IEEE, Piscataway, Nj, USA, 6261-6270. https://doi.org/10.1109/ICCV.2019.00636.

Amir Rasouli, Iuliia Kotseruba, and John K Tsotsos. 2020. Pedestrian action anticipation using contextual feature fusion in stacked rnns.

Yu Rong, Jingbo Wang, Ziwei Liu, and Chen Change Loy. 2021. Monocular 3D reconstruction of interacting hands via collision-aware factorized refinements. In 2021 International Conference on 3D Vision (3DV). IEEE, Piscataway, NJ, USA, 432-441.

Jacob Rosen, Mark MacFarlane, Christina Richards, Blake Hannaford, Mika Sinanan, et al. 1999. Surgeon-tool force/torque signatures-evaluation of surgical skills in minimally invasive surgery. Studies in health technology and informatics (1999), 290-296.

Abraham Sesshu Roth. 2000. The self-referentiality of intentions. Philosophical Studies: An International Journal for Philosophy in the Analytic Tradition 97, 1 (2000), 11-52.

K Martin Sagayam and D Jude Hemanth. 2017. Hand posture and gesture recognition techniques for virtual reality applications: a survey. Virtual Reality 21, 2 (2017), 91-107.

Fatih Saltan and Ömer Arslan. 2016. The use of augmented reality in formal education: A scoping review. Eurasia Journal of Mathematics, Science and Technology Education 13, 2 (2016), 503-520.

Nazmus Saquib, Rubaiat Habib Kazi, Li-Yi Wei, and Wilmot Li. 2019. Interactive Body-Driven Graphics for Augmented Video Performance. In Proceedings of the 2019 CHI Conference on Human Factors in Computing Systems (Glasgow, Scotland UK) (CHI '19). Association for Computing Machinery, New York, NY, USA, 1-12. https://doi.org/10.1145/3290605.3300852.

Eldon Schoop, Michelle Nguyen, Daniel Lim, Valkyrie Savage, Sean Follmer, and Björn Hartmann. 2016. Drill Sergeant: Supporting Physical Construction Projects through an Ecosystem of Augmented Tools. In Proceedings of the 2016 CHI Conference Extended Abstracts on Human Factors in Computing Systems (San Jose, California, USA) (CHI Ea '16). Association for Computing Machinery, New York, NY, USA, 1607-1614. https://doi.org/10.1145/2851581.2892429.

Thomas Schöps, Torsten Sattler, and Marc Pollefeys. 2019. Bad Slam: Bundle Adjusted Direct RGB-D Slam. In 2019 IEEE/CVF Conference on Computer Vision and Pattern Recognition (CVPR). 134-144. https://doi.org/10.1109/CVPR.2019.00022.

Kieran Setiya. 2022. Intention. In The Stanford Encyclopedia of Philosophy (Fall 2022 ed.), Edward N. Zalta and Uri Nodelman (Eds.). Metaphysics Research Lab, Stanford University, Stanford, CA, US.

Sharad Sharma, James Stigall, and Sri Teja Bodempudi. 2020. Situational awareness-based Augmented Reality Instructional (ARI) module for building evacuation. In 2020 IEEE Conference on Virtual Reality and 3D User Interfaces Abstracts and Workshops (VRW). IEEE, Piscataway, NJ, USA, 70-78.

Mel Slater. 2017. Implicit learning through embodiment in immersive virtual reality. In Virtual, augmented, and mixed realities in education. Springer, New York, NY, USA, 19-33.

Dan Song, Nikolaos Kyriazis, Iason Oikonomidis, Chavdar Papazov, Antonis Argyros, Darius Burschka, and Danica Kragic. 2013. Predicting human intention in visual observations of hand/object interactions. In 2013 IEEE International Conference on Robotics and Automation. IEEE, Piscataway, NJ, USA, 1608-1615.

Maximilian Speicher, Brian D. Hall, and Michael Nebeling. 2019. What is Mixed Reality?. In Proceedings of the 2019 CHI Conference on Human Factors in Computing Systems (Glasgow, Scotland UK) (CHI '19). Association for Computing Machinery, New York, NY, USA, 1-15. https: //doi.org/10.1145/3290605.3300767.

Kenneth I Spenner. 1990. Skill: meanings, methods, and measures. Work and Occupations 17, 4 (1990), 399-421.

Ana Stanescu, Peter Mohr, Dieter Schmalstieg, and Denis Kalkofen. 2022. Model-Free Authoring By Demonstration of Assembly Instructions in Augmented Reality. IEEE Transactions on Visualization and Computer Graphics (2022), 1-11. https://doi.org/10.1109/TVCG.2022.3203104.

Joshua Stuchlik. 2013. From volitionalism to the dual aspect theory of action. Philosophia 41, 3 (2013), 867-886.

Markus Tatzgern, Valeria Orso, Denis Kalkofen, Giulio Jacucci, Luciano Gamberini, and Dieter Schmalstieg. 2016. Adaptive information density for augmented reality displays. In 2016 IEEE Virtual Reality (VR). 83-92. https://doi.org/10.1109/VR.2016.7504691.

Dennis WH Teo and Desmond Ong. 2021. Learning from Agentic Actions: Modelling Causal Inference from Intention. In Proceedings of the Annual Meeting of the Cognitive Science Society, vol. 43. eScholarship, CA, US, 0.

Santawat Thanyadit, Parinya Punpongsanon, Thammathip Piumsomboon, and Ting-Chuen Pong. 2022. XR-LIVE: Enhancing Asynchronous Shared-Space Demonstrations with Spatial-temporal Assistive Toolsets for Effective Learning in Immersive Virtual Laboratories. Proceedings of the ACM on Human-Computer Interaction 6, CSCW1 (2022), 1-23.

Balasaravanan Thoravi Kumaravel, Fraser Anderson, George Fitzmaurice, Bjoern Hartmann, and Tovi Grossman. 2019. Loki: Facilitating Remote Instruction of Physical Tasks Using Bi-Directional Mixed-Reality Telepresence. In Proceedings of the 32nd

(56) References Cited

OTHER PUBLICATIONS

Annual ACM Symposium on User Interface Software and Technology (New Orleans, LA, USA) (UIST '19). Association for Computing Machinery, New York, NY, USA, 161-174. https://doi.org/10.1145/3332165.3347872.

Balasaravanan Thoravi Kumaravel, Cuong Nguyen, Stephen DiVerdi, and Björn Hartmann. 2019. TutoriVR: A Video-Based Tutorial System for Design Applications in Virtual Reality. In Proceedings of the 2019 CHI Conference on Human Factors in Computing Systems (Glasgow, Scotland Uk) (CHI '19). Association for Computing Machinery, New York, NY, USA, 1-12. https://doi.org/10.1145/3290605.3300514.

Aldo Uriarte-Portillo, Ramón Zatarain-Cabada, Maria Lucia Barrón-Estrada, and María Blanca Ibáñez-Espiga. 2022. ReAQ: An Intelligent Tutoring System with Augmented Reality Technology Focused on Chemistry. Research in Computing Science 149 (2022), 49-56.

Sarah Van Der Land, Alexander P Schouten, Frans Feldberg, Bart van Den Hooff, and Marleen Huysman. 2013. Lost in space? Cognitive fit and cognitive load in 3D virtual environments. Computers in Human Behavior 29, 3 (2013), 1054-1064.

Richard Vernon. 1979. Unintended consequences. Political theory 7, 1 (1979), 57-73.

Ana Villanueva, Ziyi Liu, Yoshimasa Kitaguchi, Zhengzhe Zhu, Kylie Peppler, Thomas Redick, and Karthik Ramani. 2021. Towards modeling of human skilling for electrical circuitry using augmented reality applications. International Journal of Educational Technology in Higher Education 18, 1 (2021), 1-23.

Weitian Wang, Rui Li, Yi Chen, and Yunyi Jia. 2018. Human Intention Prediction in Human-Robot Collaborative Tasks. In Companion of the 2018 ACM/IEEE International Conference on Human-Robot Interaction (Chicago, IL, USA) (HRI '18). Association for Computing Machinery, New York, NY, USA, 279-280. https://doi.org/10.1145/3173386.3177025.

Atsushi Watanabe, Tetsushi Ikeda, Yoichi Morales, Kazuhiko Shinozawa, Takahiro Miyashita, and Norihiro Hagita. 2015. Communicating robotic navigational intentions. In 2015 IEEE/RSJ International Conference on Intelligent Robots and Systems (IROS). IEEE, Piscataway, NJ, USA, 5763-5769.

Sabine Webel, Uli Bockholt, Timo Engelke, Nirit Gavish, Manuel Olbrich, and Carsten Preusche. 2013. An augmented reality training platform for assembly and maintenance skills. Robotics and autonomous systems 61, 4 (2013), 398-403.

Anne Wegerich and Matthias Rötting. 2011. A Context-Aware Adaptation System for Spatial Augmented Reality. In Digital Human Modeling, Vincent G. Duffy (Ed.). Springer Berlin Heidelberg, Berlin, Heidelberg, 417-425.

Ping Wei, Yang Liu, Tianmin Shu, Nanning Zheng, and Song-Chun Zhu. 2018. Where and Why are They Looking? Jointly Inferring Human Attention and Intentions in Complex Tasks. In 2018 IEEE/CVF Conference on Computer Vision and Pattern Recognition. IEEE, Piscataway, NJ, USA, 6801-6809. https://doi.org/10.1109/CVPR.2018.00711.

Giles Westerfield, Antonija Mitrovic, and Mark Billinghurst. 2013. Intelligent Augmented Reality Training for Assembly Tasks. In Artificial Intelligence in Education, H. Chad Lane, Kalina Yacef, Jack Mostow, and Philip Pavlik (Eds.). Springer Berlin Heidelberg, Berlin, Heidelberg, 542-551.

Alfred North Whitehead. 2010. Process and reality. Simon and Schuster, NY, US.

Matt Whitlock, George Fitzmaurice, Tovi Grossman, and Justin Matejka. 2020. AuthAR: Concurrent Authoring of Tutorials for AR Assembly Guidance. In Graphics Interface 2020. https://openreview.net/forum?id=La2hggaEcW.

Wikipedia contributors. 2022. Causality—Wikipedia, The Free Encyclopedia. https://en.wikipedia.org/w/index.php?title=Causality&oldid=1108465082 [Online; accessed Sep. 11, 2022].

George Wilson. 2008. Action. In Stanford Encyclopedia of Philosophy. Metaphysics Research Lab Philosophy Department Stanford University Stanford, Standford, CA, US.

Frederik Winther, Linoj Ravindran, Kasper Paabøl Svendsen, and Tiare Feuchtner. 2020. Design and evaluation of a vr training simulation for pump maintenance based on a use case at grundfos. In 2020 IEEE Conference on Virtual Reality and 3D User Interfaces (VR). IEEE, Piscataway, NJ, USA, 738-746.

Tomasz Wójcicki. 2014. Supporting the diagnostics and the maintenance of technical devices with augmented reality. Diagnostyka 15, 1 (2014), 43-47.

James Woodward. 2005. Making things happen: A theory of causal explanation. Oxford university press, Oxford, UK.

Jim Woodward. 2007. 19Interventionist Theories of Causation in Psychological Perspective. In Causal Learning: Psychology, Philosophy, and Computation. Oxford University Press, Oxford, UK. https://doi.org/10.1093/acprof:oso/9780195176803.003.0002 arXiv:https://academic.oup.com/book/0/chapter/313198525/chapter-ag-pdf/44495929/book_36085_section_313198525.ag.pdf.

Masahiro Yamaguchi, Shohei Mori, Peter Mohr, Markus Tatzgern, Ana Stanescu, Hideo Saito, and Denis Kalkofen. 2020. Video-Annotated Augmented Reality Assembly Tutorials. In Proceedings of the 33rd Annual ACM Symposium on User Interface Software and Technology (Virtual Event, USA) (UIST '20). Association for Computing Machinery, New York, NY, USA, 1010-1022. https://doi.org/10.1145/3379337.3415819.

Masaya Yamashita and Shigeyuki Sakane. 2001. Adaptive annotation using a human-robot interface system Partner. In Proceedings 2001 ICRA. IEEE International Conference on Robotics and Automation (Cat. No. 01CH37164), vol. 3. IEEE, Piscataway, NJ, USA, 2661-2667.

Wei Yan. 2022. Augmented reality instructions for construction toys enabled by accurate model registration and realistic object/hand occlusions. Virtual Reality 26, 2 (2022), 465-478.

Zhibo Yang, Lihan Huang, Yupei Chen, Zijun Wei, Seoyoung Ahn, Gregory Zelinsky, Dimitris Samaras, and Minh Hoai. 2020. Predicting Goal-Directed Human Attention Using Inverse Reinforcement Learning. In Proceedings of the IEEE/CVF Conference on Computer Vision and Pattern Recognition (CVPR).

Andrea F Abate, Vincenzo Loia, Michele Nappi, Stefano Ricciardi, and Enrico Boccola. 2008. ASSYST: Avatar baSed SYStem mainTenance. In 2008 IEEE Radar Conference. IEEE, Rome, Italy, 1-6.

Maria Abreu. 2018. Skills and productivity. Productivity Insights Network-View website (2018).

Jesús Humberto Aguilar and Andrei A Buckareff. 2010. Causing Human Actions: New Perspectives on the Causal Theory of Action. The MIT Press, add. http://www.jstor.org/stable/j.ctt5hhjnw.

Praditya Ajidarma and Shimon Y Nof. 2022. Skill and Knowledge Sharing in Cyber-Augmented Collaborative Physical Work Systems with HUB-CI.

Murat Akçayır and Gökçe Akçayır. 2017. Advantages and challenges associated with augmented reality for education: A systematic review of the literature. Educational Research Review 20 (2017), 1-11.

Kosmas Alexopoulos, Sotiris Makris, Vangelis Xanthakis, Konstantinos Sipsas, and George Chryssolouris. 2016. A concept for context-aware computing in manufacturing: the white goods case. International Journal of Computer Integrated Manufacturing 29, 8 (2016), 839-849.

Rasmus S. Andersen, Ole Madsen, Thomas B. Moeslund, and Heni Ben Amor. 2016. Projecting robot intentions into human environments. In 2016 25th IEEE International Symposium on Robot and Human Interactive Communication (RO-MAN). IEEE, Piscataway, NJ, USA, 294-301. https://doi.org/10.1109/ROMAN.2016.7745145.

Brenna D Argall, Sonia Chernova, Manuela Veloso, and Brett Browning. 2009. A survey of robot learning from demonstration. Robotics and autonomous systems 57, 5 (2009), 469-483.

Janet Wilde Astington. 2001. The paradox of intention: Assessing children's metarepresentational understanding. Intentions and intentionality: Foundations of social cognition 4 (2001), 85-103.

Robert Audi. 2015. The Cambridge Dictionary of Philosophy (3 ed.). Cambridge University Press, Cambridge. https://doi.org/10.1017/CBO9781139057509.

(56) References Cited

OTHER PUBLICATIONS

Muhammad Awais and Dominik Henrich. 2013. Human-robot interaction in an unknown human intention scenario. In 2013 11th International Conference on Frontiers of Information Technology. IEEE, NW Washington, DC, United States, 89-94.

Sonia Baee, Erfan Pakdamanian, Inki Kim, Lu Feng, Vicente Ordonez, and Laura Barnes. 2021. MEDIRL: Predicting the Visual Attention of Drivers via Maximum Entropy Deep Inverse Reinforcement Learning. In 2021 IEEE/CVF International Conference on Computer Vision (ICCV). 13158-13168. https://doi.org/10.1109/ICCV48922.2021.01293.

Albert Bandura. 2008. Observational Learning. John Wiley & Sons, Ltd, Hoboken, New Jersey. https://doi.org/10.1002/9781405186407. wbieco004 arXiv:https://onlinelibrary.wiley.com/doi/pdf/10.1002/9781405186407.wbieco004.

Luzheng Bi, Cuntai Guan, et al. 2019. A review on EMG-based motor intention prediction of continuous human upper limb motion for human-robot collaboration. Biomedical Signal Processing and Control 51 (2019), 113-127.

John Christopher Bishop, John Bishop, et al. 1989. Natural agency: An essay on the causal theory of action. Cambridge University Press, Cambridge, UK.

Jonas Blattgerste, Kristina Luksch, Carmen Lewa, and Thies Pfeiffer. 2021. Train AR: A Scalable Interaction Concept and Didactic Framework for Procedural Trainings Using Handheld Augmented Reality. Multimodal Technologies and Interaction 5, 7 (2021), 30.

Elizabeth Baraff Bonawitz, Darlene Ferranti, Rebecca Saxe, Alison Gopnik, Andrew N Meltzoff, James Woodward, and Laura E Schulz. 2010. Just do it? Investigating the gap between prediction and action in toddlers' causal inferences. Cognition 115, 1 (2010), 104-117.

Donald M. Borchert. 2006. The Encyclopedia of Philosophy 2nd Edition. vol. 3. Thomson Gale, Farmington Hills, MI, US.

Marc J. Buehner and Gruffydd R. Humphreys. 2009. Causal Binding of Actions to Their Effects. Psychological Science 20, 10 (2009), 1221-1228. https://doi.org/10.1111/j.1467-9280.2009.02435.x arXiv:https://doi.org/10.1111/j.1467-9280.2009.02435.x PMID: 19732384.

Yuanzhi Cao, Xun Qian, Tianyi Wang, Rachel Lee, Ke Huo, and Karthik Ramani. 2020. An Exploratory Study of Augmented Reality Presence for Tutoring Machine Tasks. In Proceedings of the 2020 CHI Conference on Human Factors in Computing Systems (Honolulu, HI, USA) (CHI '20). Association for Computing Machinery, New York, NY, USA, 1-13. https://doi.org/10.1145/3313831.3376688.

Yuanzhi Cao, Tianyi Wang, Xun Qian, Pawan S. Rao, Manav Wadhawan, Ke Huo, and Karthik Ramani. 2019. GhostAR: A Time-Space Editor for Embodied Authoring of Human-Robot Collaborative Task with Augmented Reality. In Proceedings of the 32nd Annual ACM Symposium on User Interface Software and Technology (New Orleans, LA, USA) (UIST '19). Association for Computing Machinery, New York, NY, USA, 521-534. https://doi.org/10.1145/3332165.3347902.

Jean-Rémy Chardonnet, Guillaume Fromentin, and José Outeiro. 2017. Augmented reality as an aid for the use of machine tools. Res. & Sci. Today 13 (2017), 25.

Subramanian Chidambaram, Hank Huang, Fengming He, Xun Qian, AnaMVillanueva, Thomas S Redick, Wolfgang Stuerzlinger, and Karthik Ramani. 2021. ProcessAR: An Augmented Reality-Based Tool to Create in-Situ Procedural 2D/3D AR Instructions. In Designing Interactive Systems Conference 2021 (Virtual Event, USA) (DIS '21). Association for Computing Machinery, New York, NY, USA, 234-249. https://doi.org/10.1145/3461778.3462126.

Kelly A Chillarege, Cynthia R Nordstrom, and Karen B Williams. 2003. Learning from our mistakes: Error management training for mature learners. Journal of business and psychology 17, 3 (2003), 369-385.

Michael Jae-Yoon Chung, Abram L Friesen, Dieter Fox, Andrew N Meltzoff, and Rajesh PN Rao. 2015. A Bayesian developmental approach to robotic goal-based imitation learning. PloS one 10, 11 (2015), e0141965.

Randolph Clarke. 2010. Skilled activity and the causal theory of action. Philosophy and Phenomenological Research 80, 3 (2010), 523-550.

James E Corter, Jeffrey V Nickerson, Sven K Esche, Constantin Chassapis, Seongah Im, and Jing Ma. 2007. Constructing reality: A study of remote, hands-on, and simulated laboratories. ACM Transactions on Computer-Human Interaction (TOCHI) 14, 2 (2007), 7-es.

Barney Dalgarno and Mark JW Lee. 2010. What are the learning affordances of 3-D virtual environments? British Journal of Educational Technology 41, 1 (2010), 10-32.

Dima Damen, Teesid Leelasawassuk, Osian Haines, Andrew Calway, andWalterio Mayol-Cuevas. 2014. You-Do, I-Learn: Discovering Task Relevant Objects and their Modes of Interaction from Multi-User Egocentric Video. In Proceedings of the British Machine Vision Conference. BMVA Press, Durham, DH1 3LE, UK, 1-13. https://doi.org/10.5244/C.28.30.

Wayne A Davis. 2010. The causal theory of action. A Companion to the Philosophy of Action 1 (2010), 32-39.

Iñigo Fernández del Amo, John Ahmet Erkoyuncu, Rajkumar Roy, Riccardo Palmarini, and Demetrius Onoufriou. 2018. A systematic review of Augmented Reality content-related techniques for knowledge transfer in maintenance applications. Computers in Industry 103 (2018), 47-71.

Kevin R Dixon and Pradeep K Khosla. 2004. Learning by observation with mobile robots: A computational approach. In IEEE International Conference on Robotics and Automation, 2004. Proceedings. ICRA'04. 2004, vol. 1. IEEE, Piscataway, NJ, USA, 102-107.

R Douglas Greer, Jessica Dudek-Singer, and Grant Gautreaux. 2006. Observational learning. International journal of psychology 41, 6 (2006), 486-499.

Daniel Eckhoff, Christian Sandor, Denis Kalkoten, Ulrich Eck, Christian Lins, and Andreas Hein. 2018. Tutar: Semi-automatic generation of augmented reality tutorials for medical education. In 2018 IEEE International Symposium on Mixed and Augmented Reality Adjunct (ISMAR-Adjunct). IEEE, Piscataway, NJ, USA, 430-431.

Wolfram Erlhagen, Albert Mukovskiy, Fabian Chersi, and Estela Bicho. 2007. On the development of intention understanding for joint action tasks. In 2007 ieee 6th international conference on development and learning. IEEE, Piscataway, NJ, USA, 140-145.

Hehe Fan, Tao Zhuo, Xin Yu, Yi Yang, and Mohan Kankanhalli. 2021. Understanding atomic hand-object interaction with human intention. IEEE Transactions on Circuits and Systems for Video Technology 32, 1 (2021), 275-285.

Andreas Rene Fender and Christian Holz. 2022. Causality-Preserving Asynchronous Reality. In Proceedings of the 2022 CHI Conference on Human Factors in Computing Systems (New Orleans, LA, USA) (CHI '22). Association for Computing Machinery, New York, NY, USA, Article 634, 15 pages. https://doi.org/10.1145/3491102.3501836.

C. Ailie Fraser, Tovi Grossman, and George Fitzmaurice. 2017. WeBuild: Automatically Distributing Assembly Tasks Among Collocated Workers to Improve Coordination. In Proceedings of the 2017 CHI Conference on Human Factors in Computing Systems (Denver, Colorado, USA) (CHI '17). Association for Computing Machinery, New York, NY, USA, 1817-1830. https://doi.org/10.1145/3025453.3026036.

Cinzia Freschi, Simone Parrini, N Dinelli, Mauro Ferrari, and Vincenzo Ferrari. 2015. Hybrid simulation using mixed reality for interventional ultrasound imaging training. International journal of computer assisted radiology and surgery 10, 7 (2015), 1109-1115.

Holger Friedrich and Rudiger Dillmann. 1995. Robot programming based on a single demonstration and user intentions. In 3rd European workshop on learning robots at ECML, vol. 95. Citeseer, Princeton, New Jersey, 1-7.

(56) References Cited

OTHER PUBLICATIONS

Markus Funk. 2016. Augmented reality at the workplace: a context-aware assistive system using in-situ projection. Ph.D. Dissertation. University of Stuttgart.

Amy K Gardiner, Marissa L Greif, and David F Bjorklund. 2011. Guided by intention: Preschoolers' imitation reflects inferences of causation. Journal of Cognition and Development 12, 3 (2011), 355-373.

Juan Garzón and Juan Acevedo. 2019. Meta-analysis of the impact of Augmented Reality on students' learning gains. Educational Research Review 27 (2019), 244-260.

Carol George and Judith Solomon. 2008. The caregiving system: A behavioral systems approach to parenting. In J. Cassidy & P. R. Shaver (Eds.), Handbook of attachment: Theory, research, and clinical applications 1 (2008), 833-856.

Jun Gong, Fraser Anderson, George Fitzmaurice, and Tovi Grossman. 2019. Instrumenting and Analyzing Fabrication Activities, Users, and Expertise. In Proceedings of the 2019 CHI Conference on Human Factors in Computing Systems (Glasgow, Scotland UK) (CHI '19). Association for Computing Machinery, New York, NY, USA, 1-14. https://doi.org/10.1145/3290605.3300554.

Alison Gopnik, Laura Schulz, and Laura Elizabeth Schulz. 2007. Causal learning: Psychology, philosophy, and computation. Oxford University Press, Oxford, UK.

Alison Gopnik, David M Sobel, Laura E Schulz, and Clark Glymour. 2001. Causal learning mechanisms in very young children: two-, three-, and four-year-olds infer causal relations from patterns of variation and covariation. Developmental psychology 37, 5 (2001), 620.

Michihiko Goto, Yuko Uematsu, Hideo Saito, Shuji Senda, and Akihiko Iketani. 2010. Task support system by displaying instructional video onto AR workspace. In 2010 IEEE International Symposium on Mixed and Augmented Reality. IEEE, Piscataway, NJ, USA, 83-90. https://doi.org/10.1109/ISMAR.2010.5643554.

Steve Guglielmo and Bertram F Malle. 2010. Can unintended side effects be intentional? Resolving a controversy over intentionality and morality. Personality and social psychology bulletin 36, 12 (2010), 1635-1647.

Zhao Han, Boyoung Kim, Holly A Yanco, and Tom Williams. 2022. Causal Robot Communication Inspired by Observational Learning Insights.

Bridgette Martin Hard, Sandra C Lozano, and Barbara Tversky. 2006. Hierarchical encoding of behavior: Translating perception into action. Journal of Experimental Psychology: General 135, 4 (2006), 588.

Bradley Herbert, Barrett Ens, Amali Weerasinghe, Mark Billinghurst, and Grant Wigley. 2018. Design considerations for combining augmentedreality with intelligent tutors. Computers & Graphics 77 (2018), 166-182.

Cecilia M Heyes and Chris D Frith. 2014. The cultural evolution of mind reading. Science 344, 6190 (2014), 1243091.

Ted Honderich. 2005. The Oxford companion to philosophy. OUP Oxford, Oxford, UK.

De-An Huang, Yu-Wei Chao, Chris Paxton, Xinke Deng, Li Fei-Fei, Juan Carlos Niebles, Animesh Garg, and Dieter Fox. 2020. Motion reasoning for goal-based imitation learning. In 2020 IEEE International Conference on Robotics and Automation (ICRA). IEEE, Piscataway, NJ, USA, 4878-4884.

Gaoping Huang, Xun Qian, TianyiWang, Fagun Patel, Maitreya Sreeram, Yuanzhi Cao, Karthik Ramani, and Alexander J. Quinn. 2021. AdapTutAR: An Adaptive Tutoring System for Machine Tasks in Augmented Reality. In Proceedings of the 2021 CHI Conference on Human Factors in Computing Systems (Yokohama, Japan) (CHI '21). Association for Computing Machinery, New York, NY, USA, Article 417, 15 pages. https://doi.org/10.1145/3411764.3445283.

Maria-Blanca Ibáñez and Carlos Delgado-Kloos. 2018. Augmented reality for STEM learning: A systematic review. Computers & Education 123 (2018), 109-123.

Ananya Ipsita, Levi Erickson, Yangzi Dong, Joey Huang, Alexa K Bushinski, Sraven Saradhi, Ana M Villanueva, Kylie A Peppler, Thomas S Redick, and Karthik Ramani. 2022. Towards Modeling of Virtual Reality Welding Simulators to Promote Accessible and Scalable Training. In Proceedings of the 2022 CHI Conference on Human Factors in Computing Systems (New Orleans, LA, USA) (CHI '22). Association for Computing Machinery, New York, NY, USA, Article 566, 21 pages. https://doi.org/10.1145/3491102.3517696.

Bart Jansen and Tony Belpaeme. 2006. A computational model of intention reading in imitation. Robotics and Autonomous Systems 54, 5 (2006), 394-402.

Lasse Jensen and Flemming Konradsen. 2018. A review of the use of virtual reality head-mounted displays in education and training. Education and Information Technologies 23, 4 (2018), 1515-1529.

Jingwei Ji, Ranjay Krishna, Li Fei-Fei, and Juan Carlos Niebles. 2020. Action Genome: Actions As Compositions of Spatio-Temporal Scene Graphs. In Proceedings of the IEEE/CVF Conference on Computer Vision and Pattern Recognition. 10236-10247.

Menglin Jia, Zuxuan Wu, Austin Reiter, Claire Cardie, Serge Belongie, and Ser-Nam Lim. 2021. Intentonomy: a dataset and study towards human intent understanding. In Proceedings of the IEEE/CVF Conference on Computer Vision and Pattern Recognition. IEEE, Piscataway, NJ, USA, 12986-12996.

Geun-Sik Jo, Kyeong-Jin oh, Inay Ha, Kee-Sung Lee, Myung-Duk Hong, Ulrich Neumann, and Suya You. 2014. A Unified Framework for Augmented Reality and Knowledge-Based Systems in Maintaining Aircraft. In Proceedings of the Twenty-Eighth AAAI Conference on Artificial Intelligence (Québec City, Québec, Canada) (AAAI'14). AAAI Press, Palo Alto, California, US, 2990-2997.

Mina C Johnson-Glenberg, David A Birchfield, Lisa Tolentino, and Tatyana Koziupa. 2014. Collaborative embodied learning in mixed reality motion-capture environments: Two science studies. Journal of Educational Psychology 106, 1 (2014), 86.

Arthur Juliani, Vincent-Pierre Berges, Esh Vckay, Yuan Gao, Hunter Henry, Marwan Mattar, and Danny Lange. 2018. Unity: A General Platform for Intelligent Agents. CoRR abs/1809.02627 (2018). arXiv:1809.02627 http://arxiv.org/abs/1809.02627.

Amy M Kamarainen, Shari Metcalf, Tina Grotzer, Allison Browne, Diana Mazzuca, M Shane Tutwiler, and Chris Dede. 2013. EcoMOBILE: Integrating augmented reality and probeware with environmental education field trips. Computers & Education 68 (2013), 545-556.

Sam Kavanagh, Andrew Luxton-Reilly, Burkhard Wüensche, and Beryl Plimmer. 2016. Creating 360° Educational Video: A Case Study. In Proceedings of the 28th Australian Conference on Computer-Human Interaction (Launceston, Tasmania, Australia) (OzCHI '16). Association for Computing Machinery, New York, NY, USA, 34-39. https://doi.org/10.1145/3010915.3011001.

Karen Kear, Frances Chetwynd, Judith Williams, and Helen Donelan. 2012. Web conferencing for synchronous online tutorials: Perspectives of tutors using a new medium. Computers & Education 58, 3 (2012), 953-963.

Tasneem Khan, Kevin Johnston, and Jacques Ophoff. 2019. The impact of an augmented reality application on learning motivation of students. Advances in Human-Computer Interaction 2019 (2019), 14.

Seungwon Kim, Gun Lee, Weidong Huang, Hayun Kim, Woontack Woo, and Mark Billinghurst. 2019. Evaluating the Combination of Visual Communication Cues for HMD-Based Mixed Reality Remote Collaboration. In Proceedings of the 2019 CHI Conference on Human Factors in Computing Systems (Glasgow, Scotland UK) (CHI '19). Association for Computing Machinery, NewYork, NY, USA, 1-13. https://doi.org/10.1145/3290605.3300403.

Junhan Kong, Dena Sabha, Jeffrey P Bigham, Amy Pavel, and Anhong Guo. 2021. TutorialLens: Authoring Interactive Augmented Reality Tutorials Through Narration and Demonstration. In Symposium on Spatial User Interaction (Virtual Event, USA) (SUI '21). Association for Computing Machinery, New York, NY, USA, Article 16, 11 pages. https://doi.org/10.1145/3485279.3485289.

Thomas Kubitza and Albrecht Schmidt. 2015. Towards a Toolkit for the Rapid Creation of Smart Environments. In End-User Develop-

(56) References Cited

OTHER PUBLICATIONS ment, Paloma Díaz, Volkmar Pipek, Carmelo Ardito, Carlos Jensen, Ignacio Aedo, and Alexander Boden (Eds.). Springer International Publishing, Cham, 230-235.

Tamar Kushnir and Alison Gopnik. 2005. Young children infer causal strength from probabilities and interventions. Psychological science 16, 9 (2005), 678-683.

Wallace S. Lages and Doug A. Bowman. 2019. Walking with Adaptive Augmented Reality Workspaces: Design and Usage Patterns. In Proceedings of the 24th International Conference on Intelligent User Interfaces (Marina del Ray, California) (IUI '19). Association for Computing Machinery, New York, NY, USA, 356-366. https://doi.org/10.1145/3301275.3302278.

Zouhir Lakhili, Abdelmajid El Alami, Abderrahim Mesbah, Aissam Berrahou, and Hassan Qjidaa. 2022. Rigid and non-rigid 3D shape classification based on 3D Hahn moments neural networks model. Multimedia Tools and Applications (2022), 1-24.

Changyang Li, Wanwan Li, Haikun Huang, and Lap-Fai Yu. 2022. Interactive augmented reality storytelling guided by scene semantics. ACM Transactions on Graphics (TOG) 41, 4 (2022), 1-15.

Hao-Chiang Koong Lin, Mei-Chi Chen, and Chih-Kai Chang. 2015. Assessing the effectiveness of learning solid geometry by using an augmented reality-assisted learning system. Interactive Learning Environments 23, 6 (2015), 799-810.

Robb Lindgren and Mina Johnson-Glenberg. 2013. Emboldened by embodiment: Six precepts for research on embodied learning and mixed reality. Educational researcher 42, 8 (2013), 445-452.

David Lindlbauer, Anna Maria Feit, and Otmar Hilliges. 2019. Context-Aware Online Adaptation of Mixed Reality Interfaces. In Proceedings of the 32nd Annual ACM Symposium on User Interface Software and Technology (New Orleans, LA, USA) (UIST '19). Association for Computing Machinery, New York, NY, USA, 147-160. https://doi.org/10.1145/3332165.3347945.

Su-Ju Lu and Ying-Chieh Liu. 2015. Integrating augmented reality technology to enhance children's learning in marine education. Environmental Education Research 21, 4 (2015), 525-541.

Yao Lu andWalterioWMayol-Cuevas. 2021. The object at hand: Automated editing for mixed reality video guidance from hand-object interactions. In 2021 IEEE International Symposium on Mixed and Augmented Reality (ISMAR). IEEE, Piscataway, NJ, USA, 90-98.

Elena Luchkina, Jessica A Sommerville, and David M Sobel. 2018. More than just making it go: Toddlers effectively integrate causal efficacy and intentionality in selecting an appropriate causal intervention. Cognitive Development 45 (2018), 48-56.

Derek E Lyons, Andrew G Young, and Frank C Keil. 2007. The hidden structure of overimitation. Proceedings of the National Academy of Sciences 104, 50 (2007), 19751-19756.

John Leslie Mackie. 1980. The cement of the universe: A study of causation. Clarendon Press, Walton St. Oxford OX2 6DP United Kingdom. 1 pages.

Stephen Maloney, Michael Storr, Sophie Paynter, Prue Morgan, and Dragan Ilic. 2013. Investigating the efficacy of practical skill teaching: a pilot-study comparing three educational methods. Advances in Health Sciences Education 18, 1 (2013), 71-80.

Sergo Martirosov and Pavel Kopecek. 2017. Virtual reality and its influence on training and education—literature review. Annals of DAAAM & Proceedings 28 (2017), 0708-0717.

Norman McCain, Hudson Turner, et al. 1997. Causal theories of action and change. In AAAI/IAAI. Citeseer, Princeton, New Jersey, 460-465.

Brian McLaughlin, Ansgar Beckermann, SvenWalter, et al. 2009. The Oxford handbook of philosophy of mind. Oxford University Press, Oxford, UK.

Alfred R Mele. 1987. Are intentions self-referential? Philosophical Studies: An International Journal for Philosophy in the Analytic Tradition 52, 3 (1987), 309-329.

Andrew N Meltzoff. 1995. Understanding the intentions of others: re-enactment of intended acts by 18-month-old children. Developmental psychology 31, 5 (1995), 838.

Andrew N Meltzoff and Rechele Brooks. 2001. Like me as a building block for understanding other minds: Bodily acts, attention, and intention. Intentions and intentionality: Foundations of social cognition 171191 (2001), 171-191.

Andrew N Meltzoff, Anna Waismeyer, and Alison Gopnik. 2012. Learning about causes from people: observational causal learning in 24-month-old infants. Developmental psychology 48, 5 (2012), 1215.

Paul Milgram and Fumio Kishino. 1994. A taxonomy of mixed reality visual displays. IEICE Transactions on Information and Systems 77, 12 (1994), 1321-1329.

Sushmita Mitra and Tinku Acharya. 2007. Gesture Recognition: A Survey. IEEE Transactions on Systems, Man, and Cybernetics, Part C (Applications and Reviews) 37, 3 (2007), 311-324. https://doi.org/10.1109/TSMCC.2007.893280.

Peter Mohr, David Mandl, Markus Tatzgern, Eduardo Veas, Dieter Schmalstieg, and Denis Kalkofen. 2017. Retargeting Video Tutorials Showing Tools With Surface Contact to Augmented Reality. In Proceedings of the 2017 CHI Conference on Human Factors in Computing Systems (Denver, Colorado, USA) (CHI '17). Association for Computing Machinery, New York, NY, USA, 6547-6558. https://doi.org/10.1145/3025453.3025688.

Alejandro Monroy Reyes, Osslan Osiris Vergara Villegas, Erasmo Miranda Bojorquez, Vianey Guadalupe Cruz Sanchez, and Manuel Nandayapa. 2016. A mobile augmented reality system to support machinery operations in scholar environments. Computer Applications in Engineering Education 24, 6 (2016), 967-981.

Louise Moody, Alan Waterworth, Avril D McCarthy, Peter J Harley, and Rod H Smallwood. 2008. The feasibility of a mixed reality surgical training environment. Virtual Reality 12, 2 (2008), 77-86.

SK Ong and ZB Wang. 2011. Augmented assembly technologies based on 3D bare-hand interaction. CIRP annals 60, 1 (2011), 1-4.

Elisabeth Pacherie. 2006. Toward a Dynamic Theory of Intentions. (Feb. 2006). https://doi.org/10.7551/mitpress/9780262162371.003.0009.

Antigoni Parmaxi and Alan A Demetriou. 2020. Augmented reality in language learning: A state-of-the-art review of 2014-2019. Journal of Computer Assisted Learning 36, 6 (2020), 861-875.

Satoshi Yonemoto. 2013. Seamless annotation display for augmented reality. In 2013 International Conference on Cyberworlds. IEEE, Piscataway, NJ, USA, 387-387.

Yoon, Susan A, and Elinich, Karen and Wang, Joyce and Steinmeier, Christopher and Tucker, Sean. 2012. Using augmented reality and knowledge building scaffolds to improve learning in a science museum. International Journal of Computer-Supported Collaborative Learning 7, 4 (2012), 519-541.

ML Yuan, SK Ong, and AYC Nee. 2008. Augmented reality for assembly guidance using a virtual interactive tool. International journal of production research 46, 7 (2008), 1745-1767.

Gregory J. Zelinsky, Yupei Chen, Seoyoung Ahn, and Hossein Adeli. 2020. Chapter Eight—Changing perspectives on goal-directed attentioncontrol: The past, present, and future of modeling fixations during visual search. In Gazing Toward the Future: Advances in Eye Movement Theory and Applications, Kara D. Federmeier and Elizabeth R. Schotter (Eds.). Psychology of Learning and Motivation, vol. 73. Academic Press, 231-286. https://doi.org/10.1016/bs.plm.2020.08.001.

He Zhang, Yuting Ye, Takaaki Shiratori, and Taku Komura. 2021. ManipNet: Neural manipulation synthesis with a hand-object spatial representation. ACM Transactions on Graphics (ToG) 40, 4 (2021), 1-14.

J. Zhu, S.K. Ong, and A.Y.C. Nee. 2015. A context-aware augmented reality assisted maintenance system. International Journal of Computer Integrated Manufacturing 28, 2 (2015), 213-225. https://doi.org/10.1080/0951192X.2013.874589 arXiv:https://doi.org/10.1080/0951192X.2013.874589.

Zhiwei Zhu, Vlad Branzoi, Michael Wolverton, Glen Murray, Nicholas Vitovitch, Louise Yarnall, Girish Acharya, Supun Samarasekera, and Rakesh Kumar. 2014. AR-mentor: Augmented reality based mentoring system. In 2014 IEEE international symposium on mixed and augmented reality (ISMAR). IEEE, Piscataway, NJ, USA, 17-22.

(56) References Cited

OTHER PUBLICATIONS

Zuyuan Zhu and Huosheng Hu. 2018. Robot learning from demonstration in robotic assembly: A survey. Robotics 7, 2 (2018), 17.
Roger G Barker and Herbert F Wright. 1951. One boy's day; a specimen record of behavior. (1951).
Jonas Blattgerste, Patrick Renner, and Thies Pfeiffer. 2019. Authorable augmented reality instructions for assistance and training in work environments. In Proceedings of the 18th International Conference on Mobile and Ubiquitous Multimedia. 1-11.
Subramanian Chidambaram, Sai Swarup Reddy, Matthew Rumple, Ananya Ipsita, Ana Villanueva, Thomas Redick, Wolfgang Stuerzlinger, and Karthik Ramani. 2022. EditAR: A Digital Twin Authoring Environment for Creation of AR/VR and Video Instructions from a Single Demonstration. In 2022 IEEE International Symposium on Mixed and Augmented Reality (ISMAR). IEEE, 326-335.
Roberto De Ponti, Jacopo Marazzato, Andrea M Maresca, Francesca Rovera, Giulio Carcano, and Marco M Ferrario. 2020. Pre-graduation medical training including virtual reality during COVID-19 pandemic: a report on students' perception. BMC medical education 20 (2020), 1-7.
Mehrad Faridan, Bheesha Kumari, and Ryo Suzuki. 2023. ChameleonControl: Teleoperating Real Human Surrogates through Mixed Reality Gestural Guidance for Remote Hands-on Classrooms. In Proceedings of the 2023 CHI Conference on Human Factors in Computing Systems. 1-13.
Jannike Illing, Philipp Klinke, Max Pfingsthorn, and Wilko Heuten. 2021. Less is More! Support of Parallel and Time-Critical Assembly Tasks with Augmented Reality. In Proceedings of Mensch Und Computer 2021 (Ingolstadt, Germany) (MuC '21). Association for Computing Machinery, New York, NY, USA, 215-226. https://doi.org/10.1145/3473856.3473861.
Marie Høxbro Knudsen, Niklas Breindahl, Tor-Salve Dalsgaard, Dan Isbye, Anne Grethe Mølbak, Gerhard Tiwald, Morten Bo Søndergaard Svendsen, Lars Konge, Joanna Bergström, and Tobias Todsen. 2023. Using Virtual Reality Head-Mounted Displays to Assess Skills in Emergency Medicine: Validity Study. Journal of Medical Internet Research 25 (2023), e45210.
Christopher A Kurby and Jeffrey M Zacks. 2008. Segmentation in the perception and memory of events. Trends in cognitive sciences 12, 2 (2008), 72-79.
Yann Labbe, Lucas Manuelli, Arsalan Mousavian, Stephen Tyree, Stan Birchfield, Jonathan Tremblay, Justin Carpentier, Mathieu Aubry, Dieter Fox, and Josef Sivic. 2022. Megapose: 6d pose estimation of novel objects via render & compare. arXiv preprint arXiv:2212.06870 (2022).
Jen-Shuo Liu, Carmine Elvezio, Barbara Tversky, and Steven Feiner. 2021. Using Multi-Level Precueing to Improve Performance in Path-Following Tasks in Virtual Reality. IEEE Transactions on Visualization and Computer Graphics 27, 11 (2021), 4311-4320. https://doi.org/10.1109/TVCG.2021.3106476.
Jen-Shuo Liu, Barbara Tversky, and Steven Feiner. 2022. Precueing object placement and orientation for manual tasks in augmented reality. IEEE Transactions on Visualization and Computer Graphics 28, 11 (2022), 3799-3809.
Jen-Shuo Liu, Barbara Tversky, and Steven Feiner. 2022. Precueing Sequential Rotation Tasks in Augmented Reality. In Proceedings of the 28th ACM Symposium on Virtual Reality Software and Technology (Tsukuba, Japan) (VRST '22). Association for Computing Machinery, New York, NY, USA, Article 19, 11 pages. https://doi.org/10.1145/3562939.3565641.
Jen-Shuo Liu, Barbara Tversky, and Steven Feiner. 2022. A Testbed for Exploring Multi-Level Precueing in Augmented Reality. In 2022 IEEE Conference on Virtual Reality and 3D User Interfaces Abstracts and Workshops (VRW). 540-541. https://doi.org/10.1109/VRW55335.2022.00121.
Jen-Shuo Liu, Portia Wang, Barbara Tversky, and Steven Feiner. 2022. Adaptive Visual Cues for Guiding a Bimanual Unordered Task in Virtual Reality. In 2022 IEEE International Symposium on Mixed and Augmented Reality (ISMAR). 431-440. https://doi.org/10.1109/ISMAR55827.2022.00059.
Ziyi Liu, Zhengzhe Zhu, Enze Jiang, Feichi Huang, Ana M Villanueva, Xun Qian, Tianyi Wang, and Karthik Ramani. 2023. InstruMentAR: Auto-Generation of Augmented Reality Tutorials for Operating Digital Instruments Through Recording Embodied Demonstration. In Proceedings of the 2023 CHI Conference on Human Factors in Computing Systems. 1-17.
Albert Michotte. 2017. The perception of causality. vol. 21. Routledge.
Giuseppe Riva, John A. Waterworth, Eva L. Waterworth, and Fabrizia Mantovani. 2011. From intention to action: The role of presence. New Ideas in Psychology 29, 1 (2011), 24-37. https://doi.org/10.1016/j.newideapsych.2009.11.002.
David A. Rosenbaum, Rajal G. Cohen, Steven A. Jax, Daniel J. Weiss, and Robrecht van der Wel. 2007. The problem of serial order in behavior: Lashley's legacy. Human Movement Science 26, 4 (2007), 525-554. https://doi.org/10.1016/j.humov.2007.04.001 European Workshop on Movement Science 2007.
Benjamin Volmer, James Baumeister, Stewart Von Itzstein, Ina Bornkessel-Schlesewsky, Matthias Schlesewsky, Mark Billinghurst, and Bruce H Thomas. 2018. A comparison of predictive spatial augmented reality cues for procedural tasks. IEEE transactions on visualization and computer graphics 24, 11 (2018), 2846-2856.
Julian Wolf, Quentin Lohmeyer, Christian Holz, and Mirko Meboldt. 2021. Gaze Comes in Handy: Predicting and Preventing Erroneous Hand Actions in AR-Supported Manual Tasks. In 2021 IEEE International Symposium on Mixed and Augmented Reality (ISMAR). 166-175. https://doi.org/10.1109/ISMAR52148.2021.00031.
Li-Chen Wu, I-Chen Lin, and Ming-Han Tsai. 2016. Augmented reality instruction for object assembly based on markerless tracking. In Proceedings of the 20th ACM SIGGRAPH Symposium on Interactive 3D Graphics and Games. 95-102.

* cited by examiner

Linear causal relation A-B
Convergent causal relation=B-D and C-D
Divergent causal relation=A-B and A-C
Immediate causal relation=A-B, B-D, C-D, D-E
Later causal relation=B-E and A-D

| Event | No. | Interactions | Object involved in interaction |
|---|---|---|---|
| Base Installation | 1 | Move a base panel up onto a table | Base, desk |
| | 2 | fix the base panel with clamp A | Base, desk and clamp A |
| | 3 | fix the base panel with clamp B | Base, desk and clamp B |
| | 4 | Strike hammer to check the stability | Hammer, base |
| Printing Ruler from a 3D printer | 5 | Rotate the printer | Printer |
| | 6 | Attach PVA to printer | PVA and Printer |
| | 7 | Attach PLA to printer | PLA and Printer |
| | 8 | Attach HIPS to printer | HIPS and Printer |
| | 9 | Insert hard drive to load CAD model | Hard drive and printer |
| | 10 | Press Start button | Printer |
| | 11 | Pick ruler from printer | Ruler and printer |
| Stand Installation | 12 | Mark 12 inch from the end on the base with ruler | Ruler, base and base |
| | 13 | Move the bolt to the location | Screwdriver and bolt |
| | 14 | Align the stand to the bolt | Stand and bolt |
| | 15 | Fix the stand with screwdriver | Screwdriver, stand and base |
| | 16 | Mark 12 inches on stand from the top with ruler | Ruler, stand and base |
| Arm Installation | 17 | Slide the arm to the location | Arm and stand |
| | 18 | Fix the arm to the stand | Screwdriver, stand and arm |
| Mount Installation | 19 | Slide the mount into the arm | Mount and arm |
| | 20 | Fix the mount with screwdriver | Screwdriver, mount and stand |
| | 21 | Align board with mount | Board and mount |
| | 22 | Drill two holes on the board | Drill gun and board |
| | 23 | Screw the bolts | Wrench, bolts and boards |
| Camera Attachment | 24 | Mark 12 inch from the end on the base with ruler | Ruler, base and base |

FIG. 5C

VISUALIZING CAUSALITY IN MIXED REALITY FOR MANUAL TASK LEARNING

This application claims the benefit of priority of U.S. provisional application Ser. No. 63/418,609, filed on Oct. 23, 2022 and U.S. provisional application Ser. No. 63/479,810, filed on Jan. 13, 2023, the disclosures of which are herein incorporated by reference in their entireties.

GOVERNMENT LICENSE RIGHTS

This invention was made with government support under contract number DUE1839971 awarded by the National Science Foundation. The government has certain rights in the invention.

FIELD

The device and method disclosed in this document relates to augmented, mixed, and virtual reality and, more particularly, to visualizing causality for manual task learning in augmented, mixed, and virtual reality.

BACKGROUND

Unless otherwise indicated herein, the materials described in this section are not admitted to be the prior art by inclusion in this section.

The efficiency and productivity of human workers rely heavily on their skills. Particularly, manufacturing workers are expected to undergo extensive training to master procedures involving various machines and tools. Similarly, a chef, plumber, athlete, or surgeon must acquire and master the trade's requisite knowledge encompassing perceptive, cognitive, and motor skills. Skilled labor demands a fundamental understanding of relevant processes, enabling insight into the efficacy of procedures, the consequences of actions, and how tools can be safely, reliably, and efficiently used. In addition, the labor market is increasingly demanding that people acquire spatial, collaborative, and predictive task abilities so that they perform well with other humans and machines in shared spaces and workflows.

The term "skill learning" can be defined as the comprehension of tools, techniques, processes, and product knowledge, which are vital components of a workers' development and their industry's productivity. To this end, research on training novices in new areas has gained critical importance, and the learning advantages provided by Mixed Reality (MR) are being extensively explored. MR is a technology that combines the physical and digital worlds and has been increasingly utilized for manual task learning across various domains such as assembly, machine tasks, and medical training. Manual task learning involves the acquisition of skills necessary to perform activities that require hand-eye coordination and physical manipulation and has thus been significantly enhanced by the introduction of MR applications because of its immersive and realistic scenarios that allow users to practice in a safe and realistic setting with various modalities of instruction.

Current methodologies for manual task learning in MR predominantly focus on guiding the users through the process by visualizing the current steps necessary to perform a particular task. These approaches are designed to support the user's learning process by accurately and quickly guiding users through step-by-step instructions of a task. Derived from these prior works, research has pointed out that learners can anticipate future steps of a task that are connected to a current step. Similarly, discussion in the psychology community holds that humans learn tasks by understanding the causality, i.e., the cause-and-effect relationships among the steps that lie within the tasks. It is also manifested how understanding a task's cause and effect helps prevent errors in future steps. However, existing MR systems, to a large extent, do not preserve and present to the learner the causality between actions and the human intention behind those actions. In other words, existing MR systems teach 'how' to perform the task in an efficient way but do not teach 'why' each step of the task is performed.

The skill learning benefits of teaching the 'why' can be traced back to the nature of human learning behavior. It has been shown that humans learn through the performance of tasks and actions to achieve a goal. Therefore, understanding why a specific action is performed enhances implicit cognition regarding the task, leading to improved intrinsic motivation and clarity. Additionally, work in psychology has shown that from infants to adults, humans learn to act and accomplish a task in three stages. First, they observe demonstrations of the task and break them down into events. Second, they create a causality map between events by binding them temporally. Third, they infer the intention of the demonstrator to learn a task.

Thus, understanding causal relations and intentions behind actions allows humans to generalize the skills learned in one context so that they may be applied to another context. Moreover, some have argued that the ability to learn any skill by causality and intention goes beyond learning merely by imitation and results in better knowledge and performance in the task. Accordingly, what is needed is a MR skill learning methodology that better teaches causality and intention with respect to the steps performed to complete a task.

SUMMARY

A method for generating instructional content is disclosed. The method comprises generating, with a processor, a sequence of pose data for virtual hands and at least one virtual object by recording, with at least one sensor, a demonstration by a user of a task within a real-world environment in which the user interacts with at least one real-world object corresponding to the at least one virtual object. The method further comprises defining, with the processor, a plurality of segments of the sequence of pose data. Each respective segment of the plurality of segments corresponds to a respective step of a plurality of steps of the task. The method further comprises defining, with the processor, causal relationships between steps of the plurality of steps of the task. The method further comprises generating, with the processor, graphical content configured to instruct a further user how to perform the task, based on the segmented sequence of pose data and the defined causal relationships A method for providing instructional guidance for performing a task is disclosed. The method comprises storing, in a memory, instructional data defining a plurality of steps of a task and defining causal relationships between steps of the plurality of steps of the task. The plurality of steps includes interactions with at least one real-world object in a real-world environment. The method further comprises displaying, on a display, an augmented reality graphical user interface including graphical instructional elements that convey information regarding the plurality of steps of the task and that are superimposed on the real-world environment. The graphical instructional elements include (i) a first graphical representation of a current step of the plurality of steps being performed by a user and (ii) a second graphical representation of at least one future step of the plurality of steps that has a causal relationship with the current step.

BRIEF DESCRIPTION OF THE DRAWINGS

The foregoing aspects and other features of the method are explained in the following description, taken in connection with the accompanying drawings.

FIG. 5C shows a table summarizing an exemplary set of events and interactions that make up a task of constructing a camera mounting assembly FIG. 6 summarizes a methodology for visualizing causality in a task.

DETAILED DESCRIPTION

Figure 1:
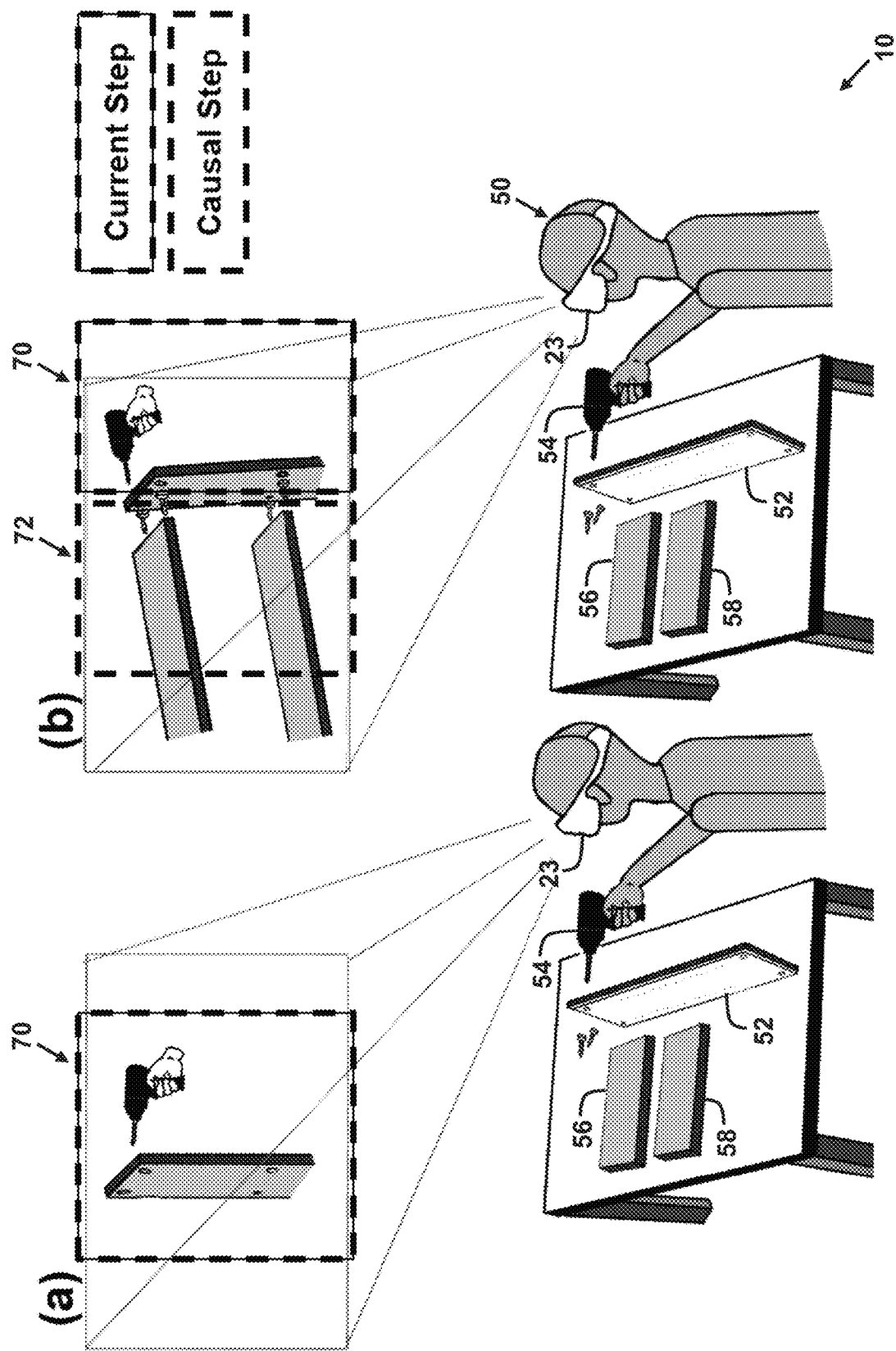
FIG. 1 illustrates a methodology for providing instructional content to a novice user that preserves and presents causality and intention of the task that is to be learned.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one skilled in the art which this disclosure pertains.

Overview

Figure 2:
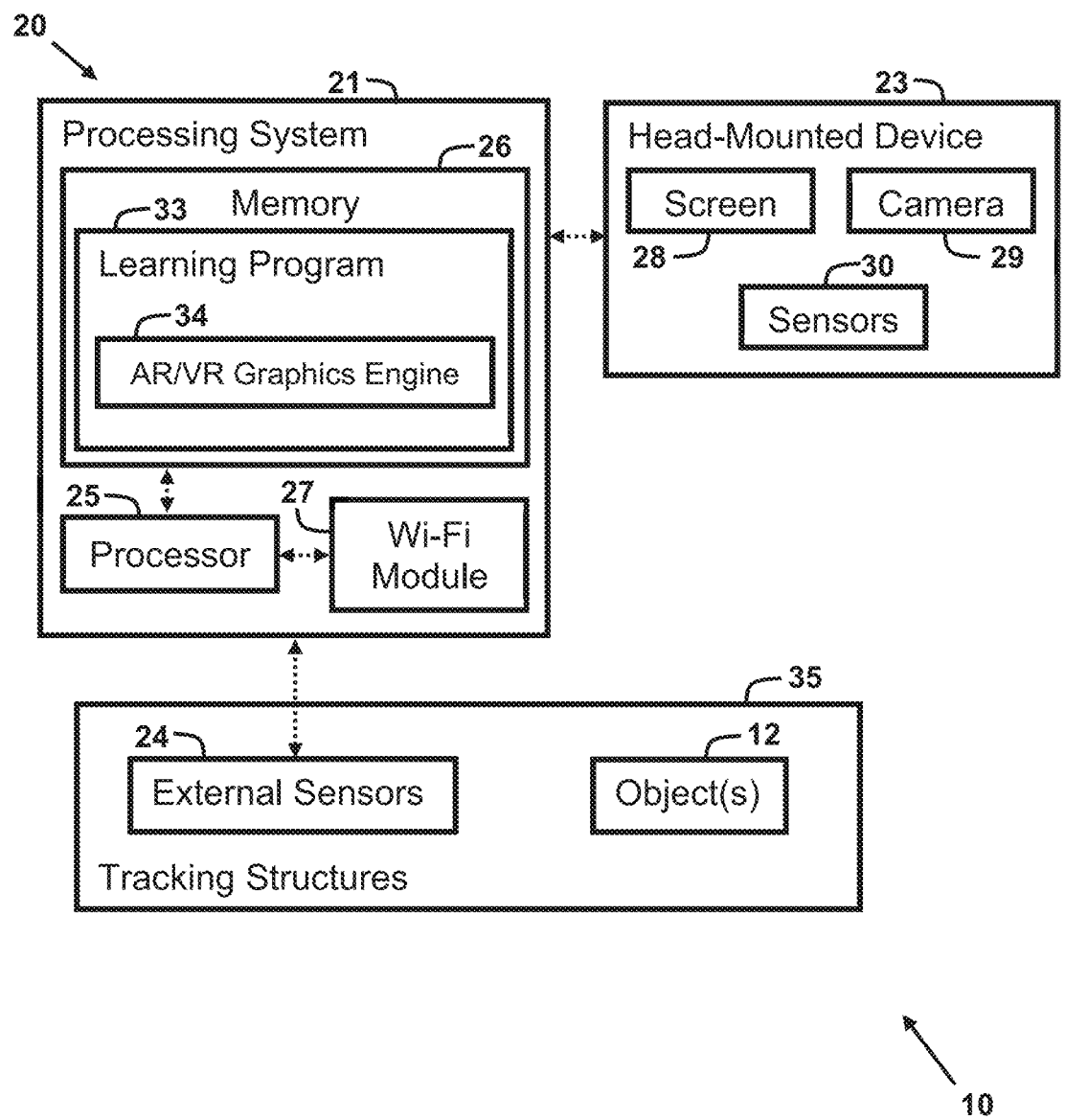
FIG. 2 shows exemplary components of a mixed reality (MR) system of the learning system.

With reference to FIGS. 1-2, exemplary embodiments of a learning system 10 that leverages intention-driven causality to enhance skill learning are described. Particularly, the learning system 10 advantageously preserves a task's intention and causal nature by including explicit representations of critical intention and causal effects for the steps of the task. To this end, learning system 10 leverages a novel hierarchical representation of causality and intention alongside a systematic workflow suitable for designing skill learning content. Additionally, the learning system 10 advantageously leverages mixed reality (MR) as a platform for providing the skill learning content. However, it should be appreciated that the learning system 10 can similarly leverage virtual reality (VR) or augmented reality (AR) techniques.

To expound on the necessity of bringing this missing element, it should be appreciated that causality and human intention play crucial roles in skill learning from a psychological point of view. By considering the object, humans, interactions, and causality, the learning system 10 provides an advantageous method of modeling human intention that provides more semantic information and is designed for observational causal learning. By incorporating intention-driven causality, the learning system 10 enhances skill learning in MR.

To model causality in MR, it is crucial to preserve intention in the task and embed it in the MR experiences of the learners. With appropriate learning design, the learners will then be appropriately challenged to master the use of new tools and then generalize their mastery within a range of similar tools and tasks. For example, when a novice welder is learning to weld, understanding how to grip the tools might not be sufficient. They must also understand why it is important to grip the tool a certain way, i.e., the impact of the tool grip on balance, distance from the target, and motion at a constant speed. In this case, the gesture of holding the welding gun and its movement is the cause, and the consistency of the weld beads and the resulting joints are the effects. If the welder understood the cause-and-effect relation while learning, they will be acquainted with the welding gun and can utilize this skill in novel contexts. Including cause and effect in any MR learning system is key to favorable learner outcomes and is driven by understanding the intention behind every step. In this disclosure, this concept is referred to as intention-driven causality for skill learning. It should be appreciated that, to transfer the implicit knowledge of the causality and intention from trainers to learners, the instructional media need to be scaffolded for: (1) spatially and temporally informative visualizations of the task's perceptive, cognitive, and motor skills, and (2) context-aware and intention-aware instructions on interacting with the tools.

FIG. 1 illustrates a methodology by which the learning system 10 provides instructional content to a novice user that preserves and presents causality and intention of the task that is to be learned. Particularly, the illustration relates to an exemplary task of assembling a cabinet. A user 50 wears a MR head-mounted-display (MR-HMD) 23 as they learn to assemble the cabinet. The MR-HMD 23 provides a MR graphical user interface in which instructional content is superimposed within the environment of the user 50, which aid the user 50 in learning how to complete the task. In a current step, the user 50 is tasked with drilling pilot holes at each end of a side board 52 of the cabinet using a handheld drill 54. In illustration (a), the MR graphical user interface includes graphical elements 70 that illustrate how to drill the pilot holes at each end of the side board 52. These graphical elements 70 guide the user 50 in finishing the current step, but fail to help the user understand the reasoning for which the pilot holes are being drilled at each end of the side board 52. In contrast, in illustration (b), the MR graphical user interface includes further graphical elements 72 that illustrate a causally related future step of the task in which the user will drive screws through the pilot holes and into a top board 56 and a bottom board 58, to attach those boards 56, 58 to the side board 52. By illustrating this future step, this user 50 better understands the causality and intention of the current step. In other words, the user understands that the pilot holes at each end of the side board 52 enable screws to be more easily and accurately driven through the side board 52 when attaching the side board 52 to another board. This helps the user 50 to better understand the benefits of pre-drilling pilot holes when attaching boards to one another, which can be applied to future tasks involving similar steps.

The learning system 10 according to the disclosure enables an author to easily develop MR tutorial content for performing a task that advantageously captures causal relationships between steps and, thus, enables such causality to be conveyed to the novice user when learning how to perform the task. Particularly, when an author demonstrates a task, their actions imbue intention. The learning system 10 advantageously adopts a taxonomy for recording the demonstration that captures not only the actions (i.e., the 'what' and the 'how') performed by the author during the demonstration, but also provides understanding of the author's intention (i.e., the 'why'). The learning system 10 captures the demonstration of the task in the form of constituent events, interactions, and gestures. Learners absorb these components, first learning the intention of the task, then the high-level actions required to complete the goal. Only then do they have the context to understand the role of lower-level components of the task. In this way, the intention of the author can be better absorbed by the learner to enhance the skill learning process. Intention-driven causality becomes a bridge, transferring skills from experts to novices.

FIG. 2 shows exemplary components of a MR system 20 of the learning system 10. It should be appreciated that the components of the MR system 20 shown and described are merely exemplary and that the MR system 20 may comprise any alternative configuration. Moreover, in the illustration of FIG. 2, only a single MR system 20 is shown. However, in practice the learning system 10 may include one or multiple MR systems 20. Moreover, it should be appreciated that the learning system 10 can similarly leverage virtual reality (VR) or augmented reality (AR) systems.

To enable the authoring of instructional media that preserves and presents causality, the learning system 10 at least includes the MR system 20, at least part of which is worn or held by a user, and one or more objects 12 (e.g., tools and workpieces) in the environment that can be interacted with by the user to demonstrate the task. The MR system 20 preferably includes the MR-HMD 23 having at least a camera and a display screen, but may include any mobile MR device, such as, but not limited to, a smartphone, a tablet computer, a handheld camera, or the like having a display screen and a camera. In one example, the MR-HMD 23 is in the form of a mixed reality, augmented reality, or virtual reality headset (e.g., Microsoft's HoloLens, Oculus Rift, or Oculus Quest) or equivalent MR glasses having an integrated or attached front-facing stereo-camera 29 (e.g., ZED Dual 4 MP Camera or ZED mini stereo camera).

In the illustrated exemplary embodiment, the MR system 20 includes a processing system 21, the MR-HMD 23, and external sensors 24. In some embodiments, the processing system 21 may comprise a discrete computer that is configured to communicate with the MR-HMD 23 and the external sensors 24 via one or more wired or wireless connections. In some embodiments, the processing system 21 takes the form of a backpack computer connected to the MR-HMD 23. However, in alternative embodiments, the processing system 21 is directly integrated with the MR-HMD 23. Moreover, the processing system 21 may incorporate server-side cloud processing systems.

In some embodiments, the learning system 10 incorporates one or more tracking structures 35 that enable the MR system 20 to provide more accurate and lower latency tracking. In one embodiment, the tracking structures 35 include a frame structure within which the user performs a demonstration of a task. At least some of the external sensors 24 may be integrated with the frame structure or integrated with the objects 12 that are interacted with by the user during the demonstration. In one embodiment, the sensor data from the external sensors 24 are wirelessly transmitted to the processing system 21.

As shown in FIG. 2, the processing system 21 comprises a processor 25 and a memory 26. The memory 26 is configured to store data and program instructions that, when executed by the processor 25, enable the MR system 20 to perform various operations described herein. The memory 26 may be of any type of device capable of storing information accessible by the processor 25, such as a memory card, ROM, RAM, hard drives, discs, flash memory, or any of various other computer-readable medium serving as data storage devices, as will be recognized by those of ordinary skill in the art. Additionally, it will be recognized by those of ordinary skill in the art that a "processor" includes any hardware system, hardware mechanism or hardware component that processes data, signals or other information. The processor 25 may include a system with a central processing unit, graphics processing units, multiple processing units, dedicated circuitry for achieving functionality, programmable logic, or other processing systems.

The processing system 21 further comprises one or more transceivers, modems, or other communication devices configured to enable communications with various other devices. Particularly, in the illustrated embodiment, the processing system 21 comprises a Wi-Fi module 27. The Wi-Fi module 27 is configured to enable communication with a Wi-Fi network and/or Wi-Fi router (not shown) and includes at least one transceiver with a corresponding antenna, as well as any processors, memories, oscillators, or other hardware conventionally included in a Wi-Fi module. As discussed in further detail below, the processor 25 is configured to operate the Wi-Fi module 27 to send and receive messages, such as control and data messages, to and from other devices via the Wi-Fi network and/or Wi-Fi router. It will be appreciated, however, that other communication technologies, such as Bluetooth, Z-Wave, Zigbee, or any other radio frequency-based communication technology can be used to enable data communications between devices in the learning system 10.

In the illustrated exemplary embodiment, the MR-HMD 23 comprises a display screen 28 and the camera 29. The camera 29 is configured to capture a plurality of images of the environment as the MR-HMD 23 is moved through the environment by the user. The camera 29 is configured to generate image frames of the environment, each of which comprises a two-dimensional array of pixels. Each pixel has corresponding photometric information (intensity, color, and/or brightness). In some embodiments, the camera 29 is configured to generate RGB-D images in which each pixel has corresponding photometric information and geometric information (depth and/or distance). In such embodiments, the camera 29 may, for example, take the form of two RGB cameras configured to capture stereoscopic images, from which depth and/or distance information can be derived, or an RGB camera with an associated IR camera configured to provide depth and/or distance information.

The display screen 28 may comprise any of various known types of displays, such as LCD or OLED screens. In at least one embodiment, the display screen 28 is a transparent screen, through which a user can view the outside world, on which certain graphical elements are superimposed onto the user's view of the outside world. In the case of a non-transparent display screen 28, the graphical elements may be superimposed on real-time images/video captured by the camera 29. In the case of non-head-mounted embodiments, the display screen 28 may comprise a touch screen configured to receive touch inputs from a user.

In some embodiments, the MR-HMD 23 may further comprise a variety of sensors 30. In some embodiments, the sensors 30 include sensors configured to measure one or more accelerations and/or rotational rates of the MR-HMD 23. In one embodiment, the sensors 30 comprise one or more accelerometers configured to measure linear accelerations of the MR-HMD 23 along one or more axes (e.g., roll, pitch, and yaw axes) and/or one or more gyroscopes configured to measure rotational rates of the MR-HMD 23 along one or more axes (e.g., roll, pitch, and yaw axes). In some embodiments, the sensors 30 include LIDAR or IR cameras. In some embodiments, the sensors 30 may include inside-out motion tracking sensors configured to track human body motion of the user within the environment, in particular positions and movements of the head, arms, and hands of the user.

The MR-HMD 23 may also include a battery or other power source (not shown) configured to power the various components within the MR-HMD 23, which may include the processing system 21, as mentioned above. In one embodiment, the battery of the MR-HMD 23 is a rechargeable battery configured to be charged when the MR-HMD 23 is connected to a battery charger configured for use with the MR-HMD 23.

The program instructions stored on the memory 26 include a learning program 33. As discussed in further detail below, the processor 25 is configured to execute the learning program 33 to enable authoring and providing instructional media in a variety of formats, at least including MR and/or AR formats. In one embodiment, the learning program 33 is implemented with the support of Microsoft Mixed Reality Toolkit (MRTK), Final IK, and mesh effect libraries 2 3 4. In one embodiment, the learning program 33 includes a graphics engine 34 (e.g., Unity3D engine, Oculus SDK), which provides an intuitive visual interface for the learning program 33. Particularly, the processor 25 is configured to execute the graphics engine 34 to superimpose on the display screen 28 graphical elements for the purpose of authoring and providing MR learning content. In the case of a non-transparent display screen 28, the graphical elements may be superimposed on real-time images/video captured by the camera 29 (i.e., video passthrough).

Exemplary Tasks

Before detailing the taxonomy of the learning system 10 and its design rationale, three exemplary tasks are analyzed. These tasks demonstrate different aspects of the structure of a task that will be important in developing the framework. As used herein, the term "task" refers to a goal or objective that is achieved by performing a set of steps and which requires some learnable set of skills to be completed. Additionally, as used herein, the term "skill learning" refers to the comprehension of tools, techniques, processes, and product knowledge to perform a task effectively. As used herein, the term "causal relationship" between a step, group of steps, or sub-step of a task with another step, group of steps, or sub-step means that the step, group of steps, or sub-step causes or is a prerequisite to the other step, group of steps, or sub-step. In other words, a step is the effect of another step if it depends upon the other step having been completed before it can be performed.

Figure 3A:
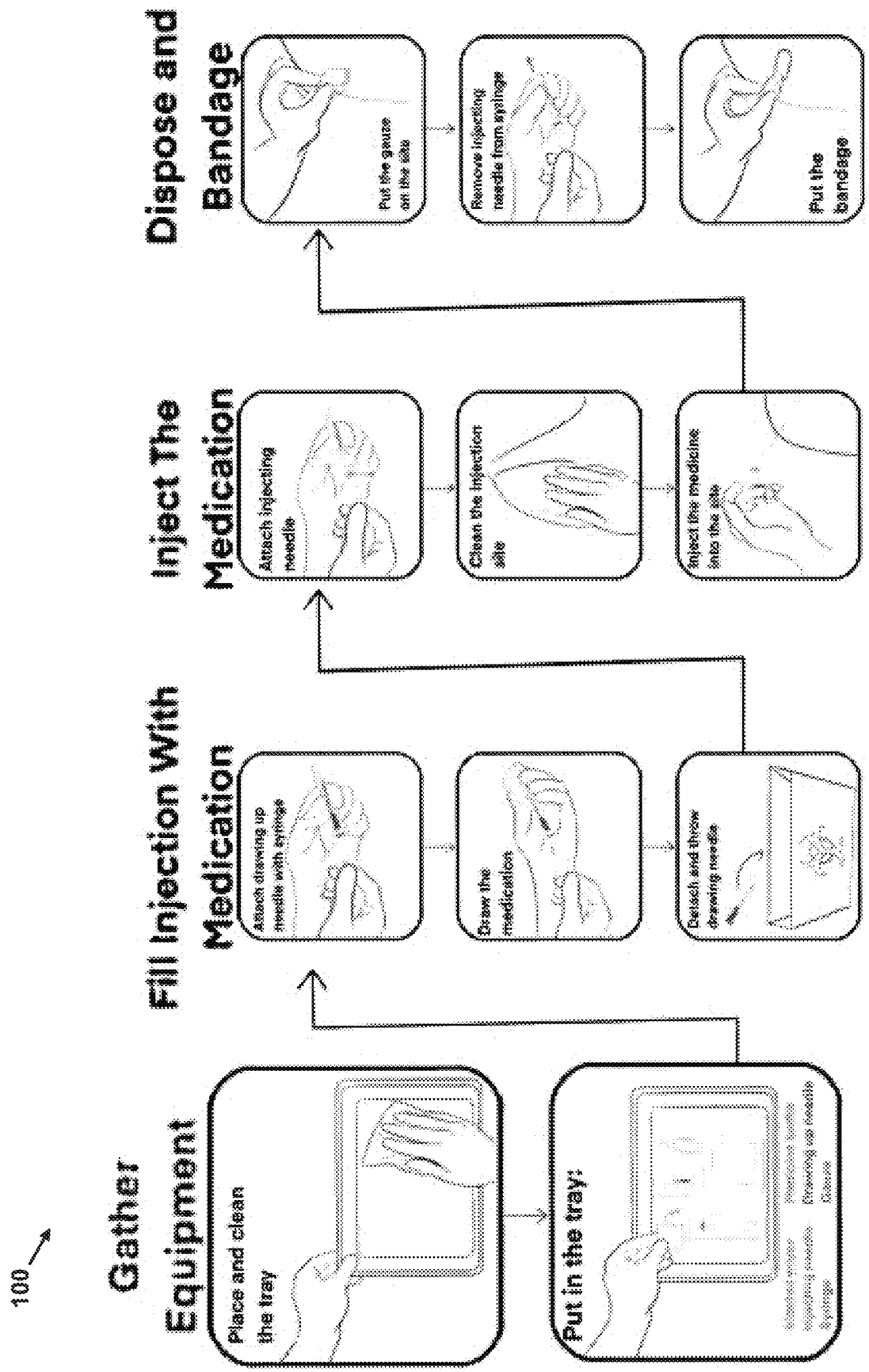
FIG. 3A shows a task diagram for a first exemplary task in which a muscular injection is administered.

FIG. 3A shows a task diagram 100 for a first exemplary task in which a muscular injection is administered, colloquially known as getting a shot. The procedure for administering the muscular injection is shown and is divided into four primary groups of steps: "Gather Equipment," "Fill Injection With Medication," "Inject The Medication," and "Dispose and Bandage." Additionally, each of the four primary groups of steps is further divided into individual steps, detailing the specific sequence of hand-object and object-object interactions necessary to complete the step. This scenario is termed "simple" because only one order of operations is allowed to complete the process, creating a causal dependency between the current and prior steps. These primary groups of steps will be referred to as "events" and the individual steps will be referred to as "interactions."

Figure 3B:
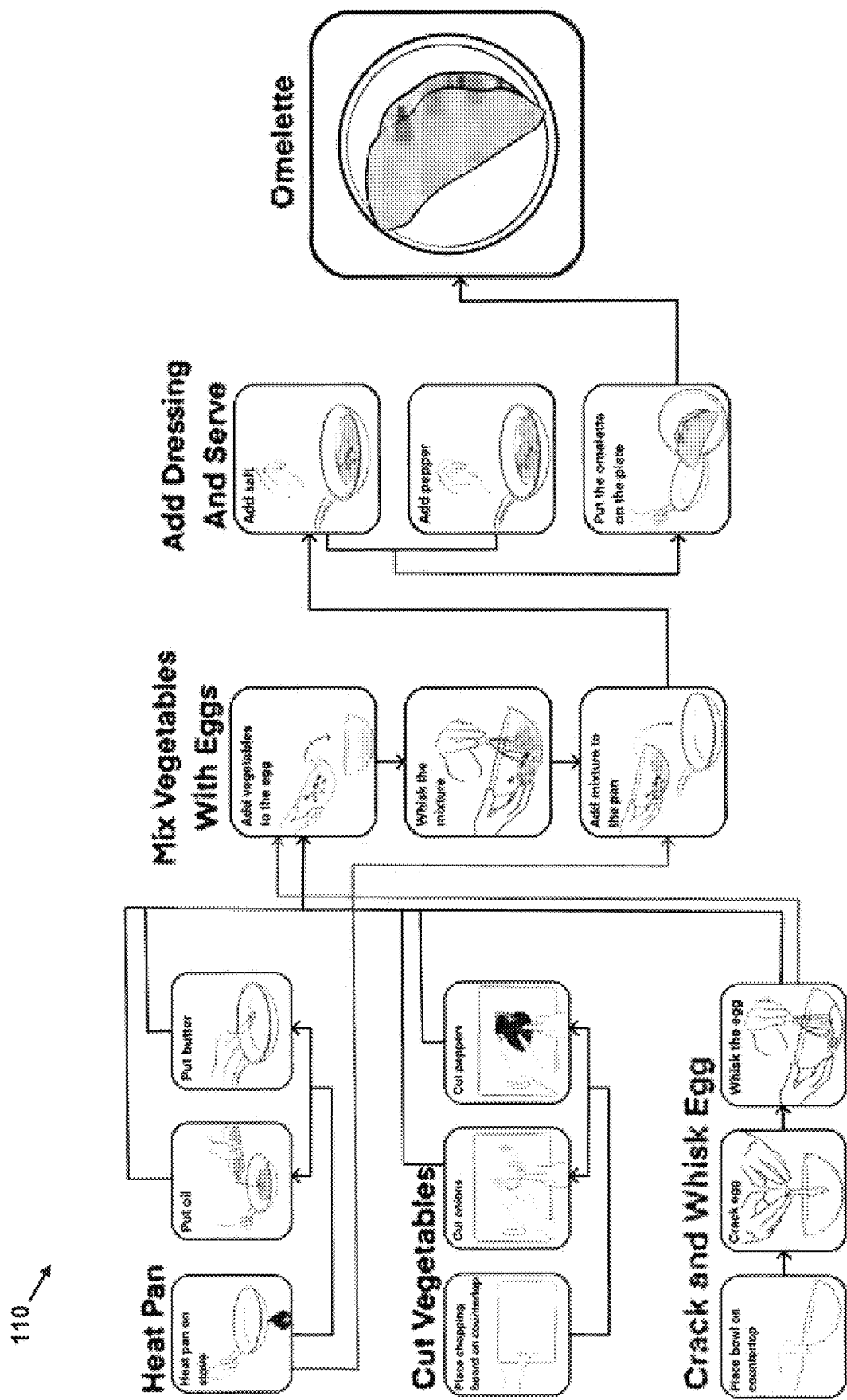
FIG. 3B shows a task diagram for a second exemplary task in which an omelet is cooked.

FIG. 3B shows a task diagram 110 for a second exemplary task in which an omelet is cooked. The procedure for cooking an omelet is shown and is broken down into multiple events and interactions. The difference between this second task and the first task described above is that the "Mix Vegetables with Eggs" event has multiple event dependencies, namely the "Heat Pan" event, the "Cut Vegetables" event, and the "Crack and Whisk Egg." These three events, regardless of order, need to be completed before the "Mix Vegetables with Eggs" event can be completed. Otherwise, the omelet will not be made successfully. These dependencies can be visualized in FIG. 3B as the directed arrows between events. In the illustration, an arrow's dependence, or source, is the cause. The "dependent" event or the arrow's destination, is the effect. Hence, the "Mix Vegetables with Eggs" event is termed "multi-causal" because multiple prerequisite events are required before the event can be completed.

Further, due to the nature of multi-causal relationships, the effect event is not immediately performed for at least one causal event. For example, the "Heat Pan" event and the "Cut Vegetables" event can't occur at the same time, but both must be completed before the "Mix Vegetables with Eggs" event can begin. Therefore, one causal event is sandwiched between the "Mix Vegetables with Eggs" event and the other causal event. Thus, a multi-causal event implies the existence of both immediate and delayed causal relations, where the immediacy is determined by order of operations.

Figure 3C:
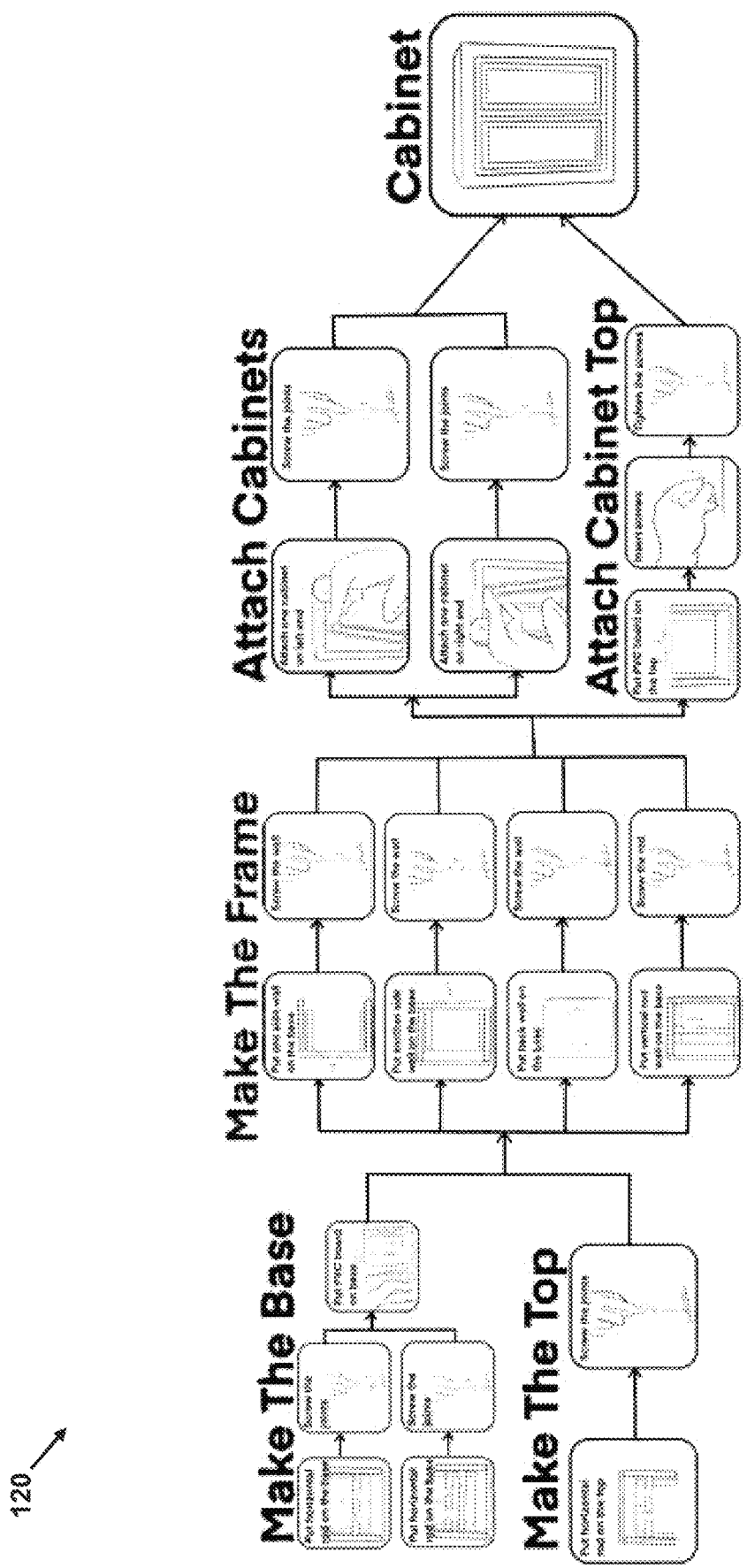
FIG. 3C shows a task diagram for a third exemplary task in which a cabinet is assembled.

FIG. 3C shows a task diagram 120 for a third exemplary task in which a cabinet is assembled. The procedure for assembling a cabinet is shown and is broken down into multiple events and interactions. Like the previous example, this task has multi-causal relationships. However, this task also incorporates a different type of relationship in which one event is the cause of multiple events, termed a "multi-effect" relation. For example, the "Make the Frame" event is the cause for multiple effect events include the "Attach Cabinets" event and the "Attach Cabinet Top" event. This key takeaway here is that there can be any number of dependency edges coming in and out of a given event node. Additionally, with reference again to FIG. 3B, it should be noted that, in the "Cooking an Omelet" task, interactions can have a similar multi-effect relationship, as demonstrated by the interactions in the "Heat Pan" event, wherein the "Heat pan on stove" interaction leads to the "Put oil" and "Put butter" interactions.

From the above exemplary tasks, it should be appreciated that the causal relationships between steps of a task can be much more complicated than merely a linear sequence of steps in which each step is caused by the immediately prior step. Particularly, a step may be caused by a prior step that is not the immediately previous step and, likewise, a step may be the cause of a future step that is not the immediately subsequent step. Moreover, a step may be caused by multiple different prior steps and, likewise, a step may be the cause of multiple different later steps.

Design Rationale and Taxonomy

Figure 4:
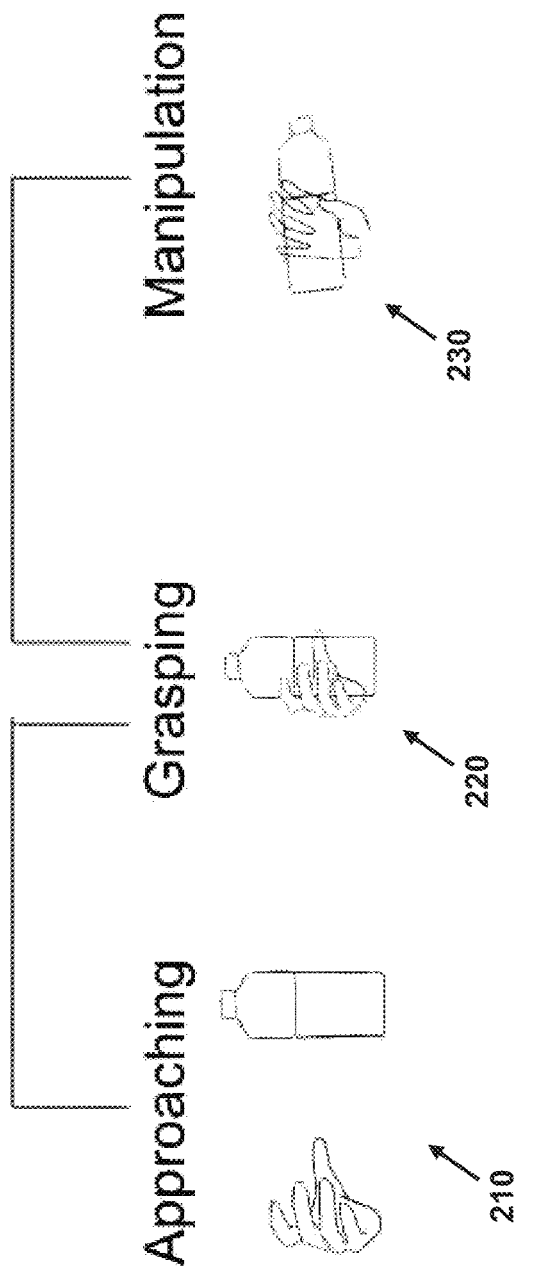
FIG. 4 shows hand gestures/object poses that make up an exemplary interaction between a hand and a bottle.

A conceptual framework for skill learning with intent-driven causality is outlined here. In the above exemplary tasks, each task was divided into events (groups of steps), and these events were further broken down into hand-object and object-object interactions (individual steps). However, an additional layer is helpful for learning. Interactions can be further broken down into hand gestures and object poses, which may collectively be referred to simply as hand/object "gestures." These hand/object gestures work together to define the sub-steps involved in a particular interaction, and capturing details at this level is advantageous for acquiring the nuance needed for intent transfer. FIG. 4 shows the sub-steps or hand gestures/object poses that make up an exemplary interaction between a hand and a bottle. Particularly, in a first stage 210, the hand is approaching the bottle. In a second stage 220, the hand grabs the bottle. Finally, in a third stage 230, the hand manipulates the bottle. In a similar way, any hand-object interaction or object-object interaction can be similarly divided into a sequences of hand/object gestures. Similar to events and interactions, this sequences of sub-steps within a particular interaction also have causal relationships therebetween.

Figure 5A:
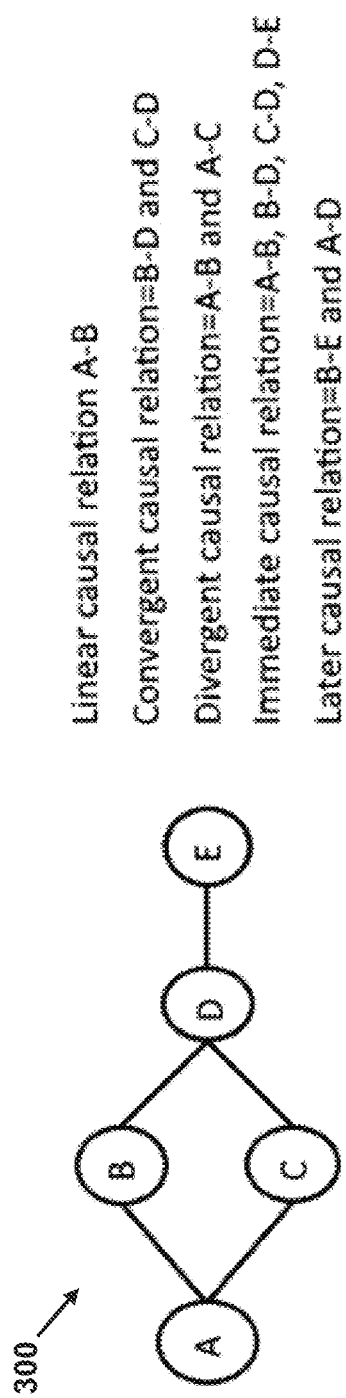
FIG. 5A shows an exemplary causality graph having different types of causal relationships.

A natural way to arrive at the framework used herein is to first transform the task diagrams (FIGS. 3A-3C) into a causality graph. FIG. 5A shows an exemplary causality graph 300 having different types of causal relationships. There are some interesting qualities of the causality graph 300 that were introduced before in the description of the task diagrams and which are made more concrete here with respect to the causality graph 300. Causality graphs are often directed, acyclic graphs in procedural tasks because the effects of events move forward with time. Another feature of causality graphs is convergence/divergence. In the causality graph 300, the nodes A, B, C, D, and E are events, and are connected by lines indicating causal relationships between the events. On the right-hand side, the relevant types of relationships are indicated. In the causality graph 300, the relationship A-B is a linear causal relationship. Convergent causal relations are those where an event has two or more causes (referred to as "multi-causal" in the task descriptions above). In the causality graph 300, the relationships B-D and C-D are convergent causal relationships. Divergent causal relations are those in which an event has two or more effects (referred to as "multi-effect" in the task descriptions above). In the causality graph 300, the relationships A-B and A-C are divergent causal relationships. Additionally, it should be appreciated that the effect of one event can be an "immediate" event or a "delayed" event. Hence, further possible classifications of causal relations are immediate causal relations and delayed causal relations. Immediate causal relations are events that happen sequentially. In the causality graph 300, the relationships A-B, B-D, C-D, and D-E are immediate causal relationships. Finally, delayed or later causal relations occur between non-sequential events. In the causality graph 300, the relationships B-E and A-D are delayed causal relationships.

Thus far, the presented taxonomy has described a task fully and has captured the necessary components useful for a learner. Tasks and events describe 'what' to do (e.g., cook an omelet, heat a pan, etc.). Additionally, interactions and hand/object gestures describe 'how' to do the parent events/ interactions to which they below (e.g., place pan on the stove, grab it by the handle, etc.). Finally, as described above, these components have causal relations with one another, thereby defining an order of operations.

However, it has not yet been clarified what brings these causal relations into being. For example, consider the "put oil" interaction of the exemplary cooking task of FIG. 3B. This interaction required a hand/object gestures (sub-step) for grabbing the bottle of oil. This hand/object gesture limits the range of possible subsequent sub-steps. However, several possibilities still yet remain such as throwing the bottle, pouring the oil, and setting down the bottle. The decisive factor is the chefs intention. The chef's expertise and fundamental understanding of the process and how relevant tools are used contribute to the 'why,' which links the bottle of oil to the pan and the rest of the cooking process. Thus, intention is the driving force that creates causal relations between all steps in a task. From a psychological perspective, the actions determined by intention constrain the possible future outcomes, driving the sequence towards a specific goal. Furthermore, people actively encode tasks with hierarchical intentions. Intention creates the 'why' behind a particular sequence of hand/object gestures and, by extension, creates the 'why' behind a series of interactions. When the why is understood, the 'what' and how' follow.

Figure 5B:
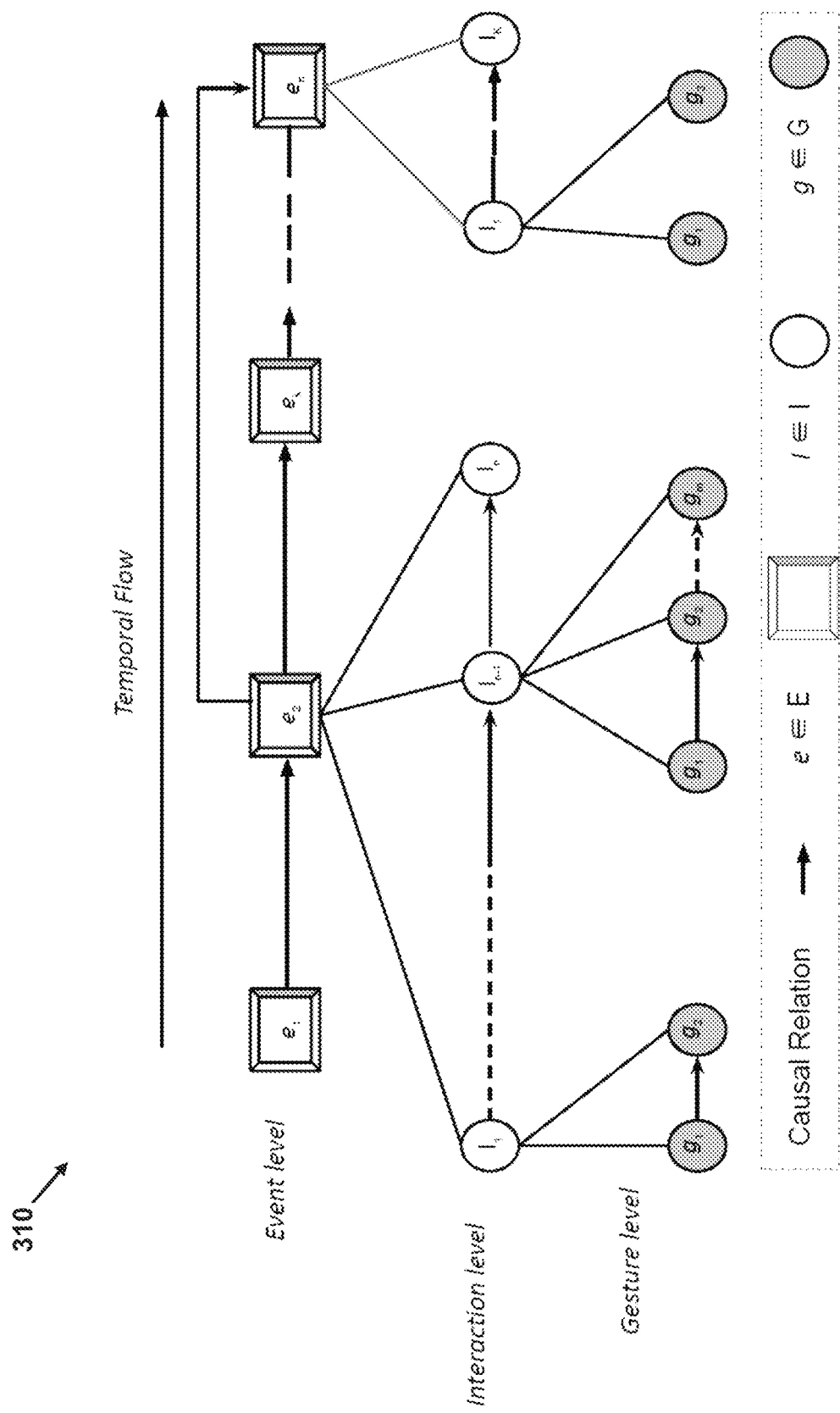
FIG. 5B shows an exemplary hierarchical causality graph that represents causal relationships between steps at multiple levels.

FIG. 5B shows an exemplary hierarchical causality graph 310 that represents causal relationships between steps at the event-level, interaction-level, and gesture-level. Particularly, for the reasons discussed above, the learning system 10 adopts a taxonomy that includes hierarchical intentions that drive causal relations, adding a layer of complexity to the taxonomy's notion of causality with inter-layer causal links. The hierarchical causality graph 310 is flattened show the sequential execution of each component in time.

Within the domains of Cognitive Science, Psychology, and Neuroscience, scholars have put forth a postulation that humans possess a tendency to segment complex tasks into distinct groups. Additionally, people understand those ongoing tasks in partonomic hierarchies. Similarly, the hierarchical causality graph 310 breaks the hierarchical task structure into numerous discrete events, which can be further parsed into interactions and further into gestures/poses. These entities—events, interactions, and gestures/poses—are denoted as nodes in the hierarchical causality graph 310. The occurrence of these elements is decided by the intentions at different levels. Moreover, intentions not only decide the occurrences but also decide the order and pattern of the elements within each layer. These interlayer connections between nodes represent cause and effect (causality) and are illustrated by directed arrows. This implies that the intentions themselves drive the causality observed at each level of the hierarchy and, thus, this intention-driven causality includes 1) event-level causality, 2) interaction-level causality, and 3) gesture level causality.

With reference to FIG. 5B, the hierarchical causality graph 310 includes one or more event nodes $e_1, \ldots, e_m$ illustrated as rectangles that represent the events of the task. Event-level causality, which refers to causal links between events, is represented by directed arrows that connect an event node to another event node. The event nodes are connected in a temporal sequence, often involving cause-and-effect relationships. The causality between events is driven by intention, particularly the intention to complete the task.

Next, for each respective event node e, the hierarchical causality graph 310 includes one or more interaction nodes $i_1, \ldots, i_n$ illustrated as circles that represent the interactions that make up the event, and which are child nodes of the respective event node e. Interaction-level causality, which refers to causal links between interactions of the same event, is represented by directed arrows that connect an interaction node to another interaction node. Interactions could be more specific actions, behaviors, or steps that contribute to the completion of an event. In particular, interactions may correspond to discrete hand-object interactions or object-object interactions. The causal relations between interactions are established due to the intention set at the event level. The overall aim here is to accomplish the event successfully.

Finally, for each respective interaction node i, the hierarchical causality graph 310 includes one or more gesture nodes $g_1, \ldots, g_m$ illustrated as circles that represent the gestures or poses that make up the interaction, and which are child nodes of the respective interaction node i. Gesture-level causality, which refers to causal links between gestures of the same interaction, is represented by directed arrows that connect a gesture node to another gesture node. Gesture-level causality deals with the temporal links between gestures/poses (referring to physical postures, configurations, or conditions of hands or objects) within an interaction. These causal relations are influenced by the intentions set at the interaction level. In this context, gestures or poses represent more granular components of interactions, and their causality is aimed at fulfilling the requirements of the interaction.

FIG. 5C shows a table 400 summarizing an exemplary set of events and interactions that make up a task of constructing a camera mounting assembly. In each case, the events and interaction are associated with a text description and a list of objects that are involved in each interaction. These text descriptions can be directly associated with individual event nodes and interaction nodes of a hierarchical causality graph. Likewise, the lists of objects that are involved in each interaction can be associated with each interaction node of a hierarchical causality graph. Thus, a hierarchical causality graph can be designed to not only represent causal relationships between steps, but also to store any information that might be conventionally used to describe the steps of a task.

Figure 6:
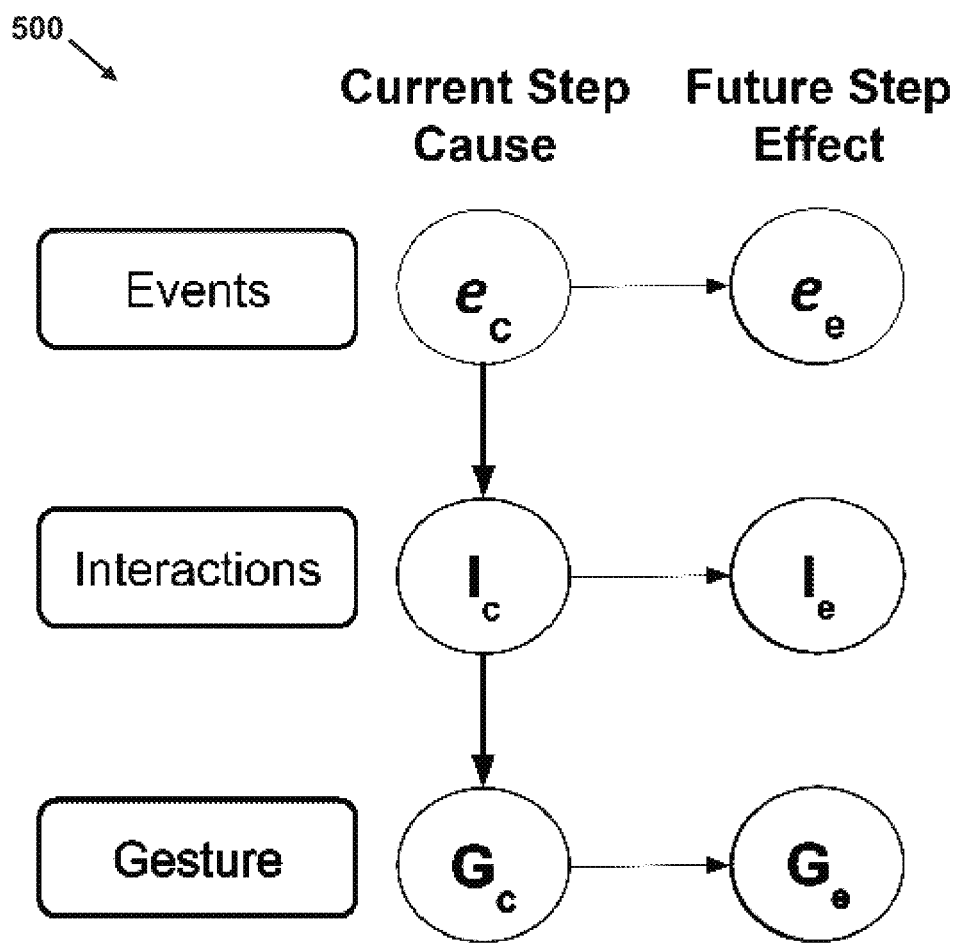

The hierarchical causality graph enables easy visualization of causality during the learning process. Particularly, a task can be visualized and presented in a manner that conveys causality by visually representing a portion of the hierarchical causality graph—Events, Interactions, and Gestures—in a MR graphical user interface. FIG. 6 summarizes a methodology 500 for visualizing causality in a task. Particularly, the visualizations of a task incorporate visualizations of a current step of the task that is being performed by the user and also incorporate visualizations of any future steps that are causally related to the current step. Additionally, the visualizations of the current task incorporate visualizations at each level of granularity, i.e., at the event level, the interaction level, and the gesture level. The visualizations of steps may incorporate both textual information regarding the respective step, as well as images or animations of the respective step. Moreover, the visualizations of each step are visually associated with one another to show causal relationships.

Methods for Authoring and Learning Using Intention-Driven Causality

A variety of methods, workflows, and processes are described below for enabling the operations and interactions of the MR system 20. In these descriptions, statements that a method, workflow, processor, and/or system is performing some task or function refers to a controller or processor (e.g., the processor 25) executing programmed instructions (e.g., the learning program 33, the graphics engine 34) stored in non-transitory computer readable storage media (e.g., the memory 26) operatively connected to the controller or processor to manipulate data or to operate one or more components in the learning system 10 to perform the task or function. Additionally, the steps of the methods may be performed in any feasible chronological order, regardless of the order shown in the figures or the order in which the steps are described.

Additionally, various MR graphical user interfaces are described for operating the MR system 20. In many cases, the MR graphical user interfaces include graphical elements that are superimposed onto the user's view of the outside world or, in the case of a non-transparent display screen 28, superimposed on real-time images/video captured by the camera 29. In order to provide these MR graphical user interfaces, the processor 25 executes instructions of the graphics engine 34 to render these graphical elements and operates the display 28 to superimpose the graphical elements onto the user's view of the outside world or onto the real-time images/video of the outside world. In many cases, the graphical elements are rendered at a position that depends upon positional or orientation information received from any suitable combination of the sensors 30 and the camera 29, so as to simulate the presence of the graphical elements in the real-world environment. However, it will be appreciated by those of ordinary skill in the art that, in many cases, an equivalent non-MR graphical user interface can also be used to operate the learning program 33, such as a user interface provided on a further computing device such as laptop computer, tablet computer, desktop computer, or a smartphone.

Moreover, various user interactions with the MR graphical user interfaces and with interactive graphical elements thereof are described. In order to provide these user interactions, the processor 25 may render interactive graphical elements in the MR graphical user interface, receive user inputs from the user, for example via gestures performed in view of the one of the camera 29 or other sensor, and execute instructions of the learning program 33 to perform some operation in response to the user inputs.

Finally, various forms of motion tracking are described in which spatial positions and motions of the user or of other objects in the environment are tracked. In order to provide this tracking of spatial positions and motions, the processor 25 executes instructions of the learning program 33 to receive and process sensor data from any suitable combination of the sensors 30, the external sensors 24, and the camera 29, and may optionally utilize visual and/or visual-inertial odometry methods such as simultaneous localization and mapping (SLAM) techniques.

Figure 7:
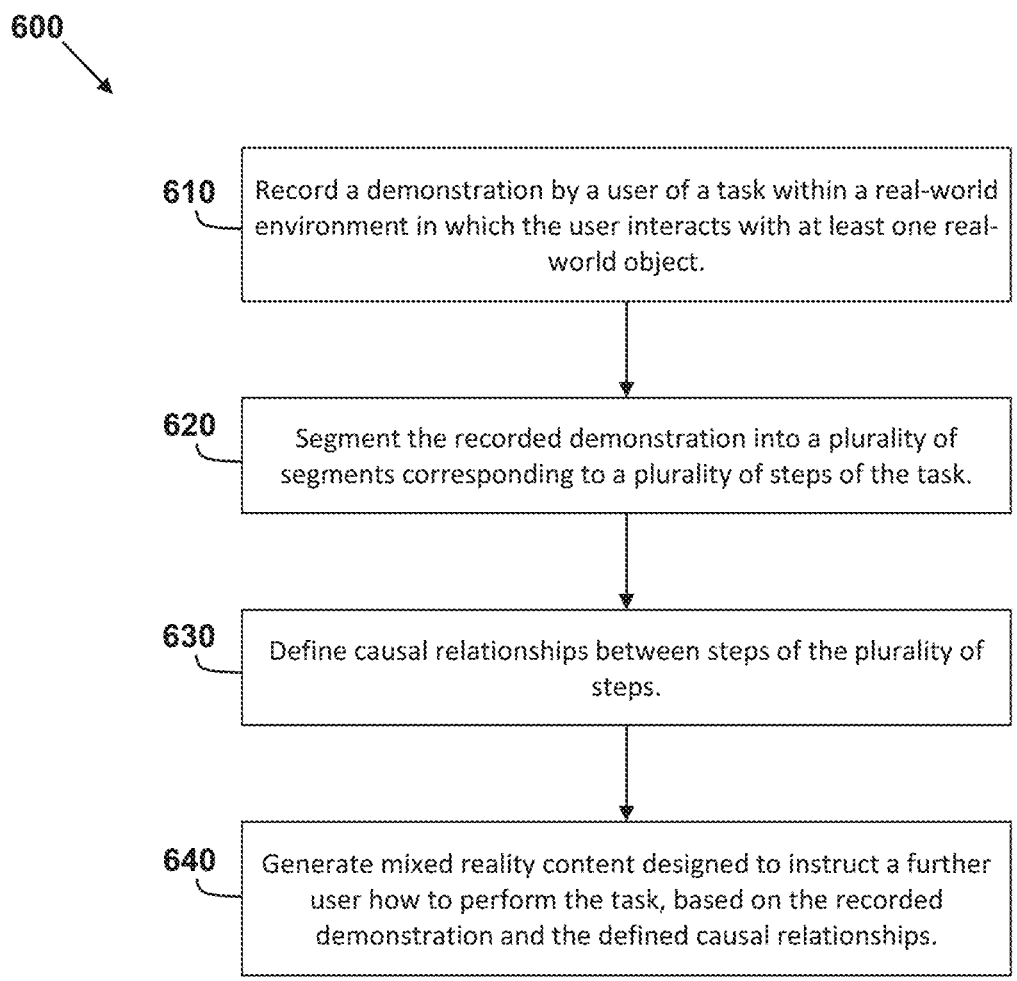
FIG. 7 shows a logical flow diagram for a method for generating instructional content that preserves intention-driven causality.

FIG. 7 shows a logical flow diagram for a method 600 for generating instructional content that preserves intention-driven causality. The method 600 advantageously leverages the taxonomy and hierarchical causality graph discussed in detail above. Particularly, the learning system 10 enables an instructor or subject matter expert to easily author instructional content for novice learners by demonstrating the task and without the need for prior experience with 3D animation or programming.

The method 600 begins with recording a demonstration by a user of a task within a real-world environment in which the user interacts with at least one real-world object (block 610). Particularly, during the authoring process, the learning system 10 records video and tracks the movement of hands, tools, workpieces, and other objects while the author performs the task, then reconstructs a 3D animation of the task frame-by-frame, placing virtual models accordingly. One or more sensors of the learning system 10 record sensor data of a demonstration by a user of a task within a real-world environment in which the user interacts with at least one real-world object.

Next, the processor 25 determines a time sequence of pose data for virtual hands, corresponding to the hands of the user, based on the sensor data of the recorded demonstration. Each frame of pose data is associated with a respective timestamp. In at least some embodiments, the processor 25 determines the virtual hand poses in the time sequence of hand pose data based on sensor data received from sensors of the AR-HMD 23, e.g., images from the camera 29 and/or sensor data measured by any of the sensors 30 integrated with the AR-HMD 23. In one embodiment, the hand tracking is performed using Oculus's hand tracking API. In at least some embodiments, the processor 25 determines the virtual hand poses in the time sequences of hand pose data based also on sensor data received from one or more of the externals sensors 24 that are affixed within the environment.

Additionally, the processor 25 determines one or more further time sequences of pose data for at least one virtual object, corresponding to the at least one real-world object, based on the sensor data of the recorded demonstration. Each frame of pose data is associated with a respective timestamp. In at least some embodiments, the processor 25 determines the object poses in the time sequences of object pose data based on sensor data received from sensors of the AR-HMD 23, e.g., images from the camera 29 and/or sensor data measured by any of the sensors 30 integrated with the AR-HMD 23. In at least some embodiments, the processor 25 determines the object poses in the time sequences of object pose data based also on sensor data received from one or more of the externals sensors 24 that are affixed within the environment.

In at least some embodiments, the learning system 10 enables the user to generate virtual models to represent each object that is involved in the demonstration of the task. These virtual models will be used, in conjunction with the sequences of pose data to generate graphical content that is incorporated in the MR instructional content for learners. In one embodiment, to generate these models, the user first uses the camera of the MR-HMD 23 or another camera (e.g., a Intel RealSense 435i camera) to scan each object requiring a virtual model, collecting RGD-B frames. Next, the processor 25 uses these frames to generate a 3D mesh, for example using an RGB-D SLAM technique (e.g., BAD-SLAM). The mesh model is then provided as an asset for the graphics engine 34 (e.g., Unity). Finally, the scanned mesh models are aligned manually with the respective physical object. This alignment provides the initial six degrees of freedom (6DoF) pose for the camera of the MR-HMD 23 (e.g., ZED camera). The position data for the objects and hands are used as frame-by-frame input for their virtual counterparts in the MR scene.

The method 600 continues with segmenting the recorded demonstration into a plurality of segments corresponding to a plurality of steps of the task (block 620). Particularly, for the purposes of generating a hierarchical causality graph that represents a plurality of steps of the task, the processor 25 defines a plurality of segments of the sequences of pose data. Each respective segment of the plurality of segments corresponds to a respective group of steps, a respective step, or a respective sub-step in the plurality of steps of the task.

As discussed above, the hierarchical causality graph may include three distinct levels of granularity in the definition of the plurality of steps that make up the task: Interactions, Events, and Gestures. In at least some embodiments, interactions (steps) correspond to discrete interactions between the user's hands and the at least one real-world object. Events (groups of steps) correspond to multiple discrete interactions between the user's hands and the at least one real-world object that define more abstracted goals or processes that must be performed to complete the task. Gestures (sub-steps) correspond to intermediate poses of the user's hands or of at least one real-world object that occur during a discrete interaction between the user's hands and the at least one real-world object.

In light of the above, in at least some embodiments, the processor 25 defines three levels of segmentation: (1) a plurality of segments corresponding to a plurality of steps (interactions), (2) a plurality of groups of segments corresponding to a plurality of groups of steps (events), and (3) for each step (interaction), a respective plurality of subsegments corresponding to a respective plurality of sub-steps (gestures) of the step. It should be appreciated that this description is not intended to imply or require and order-of-operations in the segmentation process. For example, the processor 25 can equivalently define a plurality of segments (events), a plurality of subsegments (interactions) of the segments, and a plurality of sub-subsegments (gestures) of the subsegments.

The processor 25 defines the plurality of segments corresponding to the plurality of steps (interactions) based on user inputs or automatically based on sequences of pose data from the recorded demonstration. As one example, the processor 25 detects, in the recorded demonstration of the task, discrete interactions between the user's hands and the at least one real-world object, for example, based on a 3D distance between the user's hand and the at least one real-world object. Based on the detected interactions, the processor 25 defines the plurality of segments corresponding to a plurality of steps (interactions) to each encompass a respective one of the discrete interactions between the user's hands and the at least one real-world object. Alternatively, or in addition, the graphical user interfaces of the MR system 20 enable the user to provide user inputs that manually define or adjust the segmentation of the recorded demonstration. Based on the user inputs, the processor 25 defines or adjusts the plurality of segments corresponding to the plurality of steps (interactions).

The processor 25 defines the plurality of groups of segments corresponding to the plurality of groups of steps (events) based on user inputs or automatically based on sequences of pose data from the recorded demonstration. As one example, the processor 25 clusters the discrete interactions on the basis of which objects are being interacted with. For example, each cluster may include a sequence of interactions with a single object or particular subset of objects. Based on the clustering, the processor 25 defines the plurality of groups of segments corresponding to the plurality of groups of steps (events). Alternatively, or in addition, the graphical user interfaces of the MR system 20 enable the user to provide user inputs that manually define or adjust the segment grouping of the recorded demonstration. Based on the user inputs, the processor 25 defines or adjusts the plurality of groups of segments corresponding to the plurality of groups of steps (events).

The processor 25 defines the plurality of subsegments corresponding to the plurality of sub-steps (gestures) of each step based on user inputs or automatically based on sequences of pose data from the recorded demonstration. Particularly, in one embodiment, the processor 25 automatically divides each segment into four subsegments corresponding to four sub-steps: (1) the user's hand approaching an object, (2) the user's hand grasping the object, (3) the user's hand manipulating the object, and (4) the user's hand releasing the object. Alternatively, or in addition, the graphical user interfaces of the MR system 20 enable the user to provide user inputs that manually define or adjust the sub-segmentation of the recorded demonstration. Based on the user inputs, the processor 25 defines or adjusts the plurality of groups of segments corresponding to the plurality of groups of steps (events).

The method 600 continues with defining causal relationships between steps of the plurality of steps (block 630). Particularly, the processor 25 defines causal relationships between steps of the plurality of steps of the task. More particularly, the processor 25 defines and/or generates a graph that represents the plurality of steps of the task and causal relationships between steps thereof. The graph representation includes a plurality of nodes and a plurality of edges connecting nodes of the plurality of nodes. Each node represents a respective step of the plurality of steps of the task. Each edge represents a causal relationship between steps represented by nodes connected by the edge.

In at least some embodiments, the graph representation is a hierarchical graph representation, in the form of the hierarchical causality graph described in detail above. Particularly, hierarchical causality graph includes a plurality of first nodes and a plurality of first edges connecting nodes of the plurality of first nodes representing interactions and interaction level causation in the task. Each first node represents a respective step (interaction) of the plurality of steps of the task. Each respective first edge represents a causal relationship between steps (interactions) represented by nodes connected by the respective first edge. The hierarchical causality graph further includes a plurality of second nodes and a plurality of second edges connecting nodes of the plurality of second nodes. Each second node represents a respective group of steps (event) from the plurality of steps. Each respective second edge represents a causal relationship between groups of steps (events) represented by nodes connected by the respective second edge. The hierarchical causality graph further includes a plurality of third nodes and a plurality of third edges connecting nodes of the plurality of third nodes. Each third node represents a sub-step (gesture) of a corresponding step (interaction) from the plurality of steps. Each respective third edge represents a causal relationship between sub-steps (gestures) represented by nodes connected by the respective third edge. Finally, the hierarchical causality graph may further include a plurality of fourth edges that connect nodes between hierarchical layers to indicate parent and child relationships between nodes in different layers, e.g., to indicate which interactions belong to each event or which gestures belong to each interaction.

The processor 25 defines the causal relationships in the interaction layer of the hierarchical causality graph (i.e., the plurality of first edges connecting nodes of the plurality of first nodes) based on user inputs or automatically based on the sequences of poses of the recorded demonstration. For example, in one embodiment, the processor 25 defines causal relationships in the interaction layer based on the object involved in each interaction. For example, the processor 25 may define a causal relationship between two temporally sequential interactions if they involved the same object. Alternatively, or in addition, the graphical user interfaces of the MR system 20 enable the user to provide user inputs that manually define causal relationships in the interaction layer. Based on the user inputs, the processor 25 defines causal relationships between steps (interactions) in the interaction layer of the hierarchical causality graph.

The processor 25 defines the causal relationships in the event layer of the hierarchical causality graph (i.e., the plurality of second edges connecting nodes of the plurality of second nodes) based on user inputs or automatically based on the sequences of poses of the recorded demonstration. For example, in one embodiment, the processor 25 defines causal relationships in the event layer based on the object involved in each interaction. The early interaction is the cause, and the latter interaction is the effect. For example, the processor 25 may define a causal relationship between two temporally sequential events if they involved the same object or same subset of objects. Alternatively, or in addition, the graphical user interfaces of the MR system 20 enable the user to provide user inputs that manually define causal relationships in the event layer. Based on the user inputs, the processor 25 defines causal relationships between groups of steps (events) in the event layer of the hierarchical causality graph.

The processor 25 defines the causal relationships in the gesture layer of the hierarchical causality graph (i.e., the plurality of third edges connecting nodes of the plurality of third nodes) based on user inputs or automatically according to their temporal order. For example, in one embodiment, the processor 25 defines causal relationships in the gesture layer based on the temporal sequence of the gestures. For example, the processor 25 may define a causal relationship between two temporally sequential gestures from the same interaction. The earlier gesture is the cause, and the latter gesture is the effect. Alternatively, or in addition, the graphical user interfaces of the MR system 20 enable the user to provide user inputs that manually define causal relationships in the event layer. Based on the user inputs, the processor 25 defines causal relationships between sub-steps (gestures) in the gesture layer of the hierarchical causality graph.

The method 600 concludes with generating mixed reality content designed to instruct a further user how to perform the task, based on the recorded demonstration and the defined causal relationships (block 640). Particularly, the processor 25 generates graphical content designed to instruct a further user how to perform the task. In at least some embodiments, the graphical content is mixed reality and/or augmented reality graphical content configured to be superimposed on the real-world environment using a mixed reality device and/or augmented reality device. In some embodiments, the processor 25 associates the graphical content with particular nodes of the hierarchical causality graph and/or with particular steps, groups of steps, or sub-steps of the plurality of steps represented thereby.

The processor 25 generates the graphical content based on the segmented sequence of pose data and the defined causal relationships. In at least some embodiments, the graphical content includes graphical representations, depictions, and/or illustrations of each step (interaction) of the plurality of steps of the task, as well as of each group of steps (event) and each sub-step (gesture) thereof. More particularly, the graphical content includes graphical representations that depict or illustrate both an individual step of the plurality of steps and at least one further step that is causally related to the individual step. In this way, a novice user learning the task is provided with information, not only for the current step, but also for future steps that are caused by the current step. It should be appreciated that the future step that is depicted is not necessarily a temporally next step, but is instead a step that is the effect of or is enabled by the current step. In some embodiments, the processor 25 associates the graphical representations with particular nodes of the hierarchical causality graph and/or with particular steps, groups of steps, or sub-steps of the plurality of steps represented thereby.

In some embodiments, the graphical representations of each step may include an image comprising a rendering of at least one of a virtual hand and a virtual object corresponding to the at least one real-world object. The processor 25 generates the rendering using the virtual hand and object models posed according to the corresponding segment of pose data from the recorded demonstration. Similarly, in some embodiments, the graphical representations of each step may include an animation of the step that is animated according the corresponding segment of pose data from the recorded demonstration.

Figure 8:
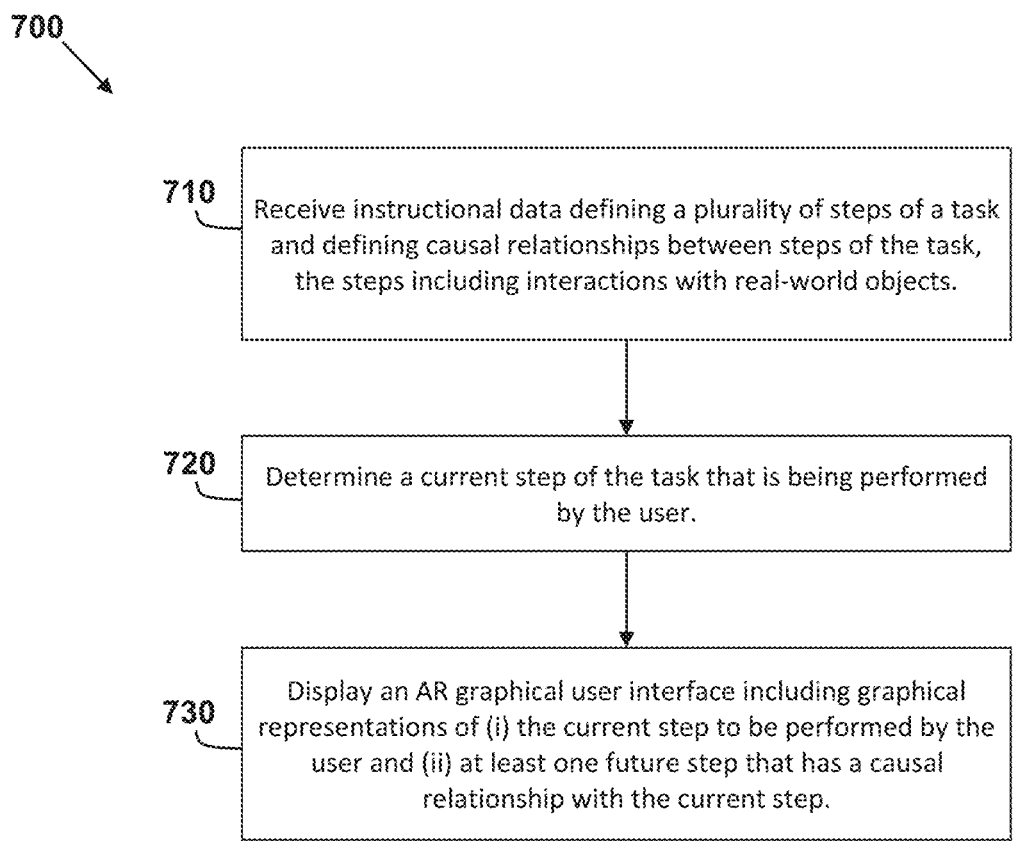
FIG. 8 shows a logical flow diagram for a method for providing instructional guidance for performing a task that presents intention-driven causality.

FIG. 8 shows a logical flow diagram for a method 700 for providing instructional guidance for performing a task that presents intention-driven causality. The method 700 advantageously provides instructional guidance to a novice user for learning how to perform a task. The graphical user interfaces of the instructional guidance advantageously display causality and intention information to the user, thereby enabling more effective learning and allows the user to self-pace their learning.

The method 700 begins with receiving instructional data defining a plurality of steps of a task and defining causal relationships between steps of the task, the steps including interactions with real-world objects (block 710). Particularly, the processor 25 receives, and/or stores in the memory 26, instructional data for teaching a novice user how to perform a task. The instructional data defines a plurality of steps of a task in which a user interacts with at least one real-world object in a real-world environment. The instructional data further defines causal relationships between steps of the plurality of steps of the task. To this end, in at least some embodiments, the instructional data includes a graph representation in the form of the hierarchical causality graph discussed above.

Additionally, the instructional data includes graphical content designed to instruct the user how to perform the task. In particular, the graphical content may include graphical representations associated with particular nodes of the hierarchical causality graph and/or with particular steps, groups of steps, or sub-steps of the plurality of steps represented thereby. As discussed above, the graphical representations may include images and/or animations representing each individual step in the plurality of steps of the task. Finally, the instructional data may further include text descriptions of each step and lists of objects involved in each step.

Figure 9:
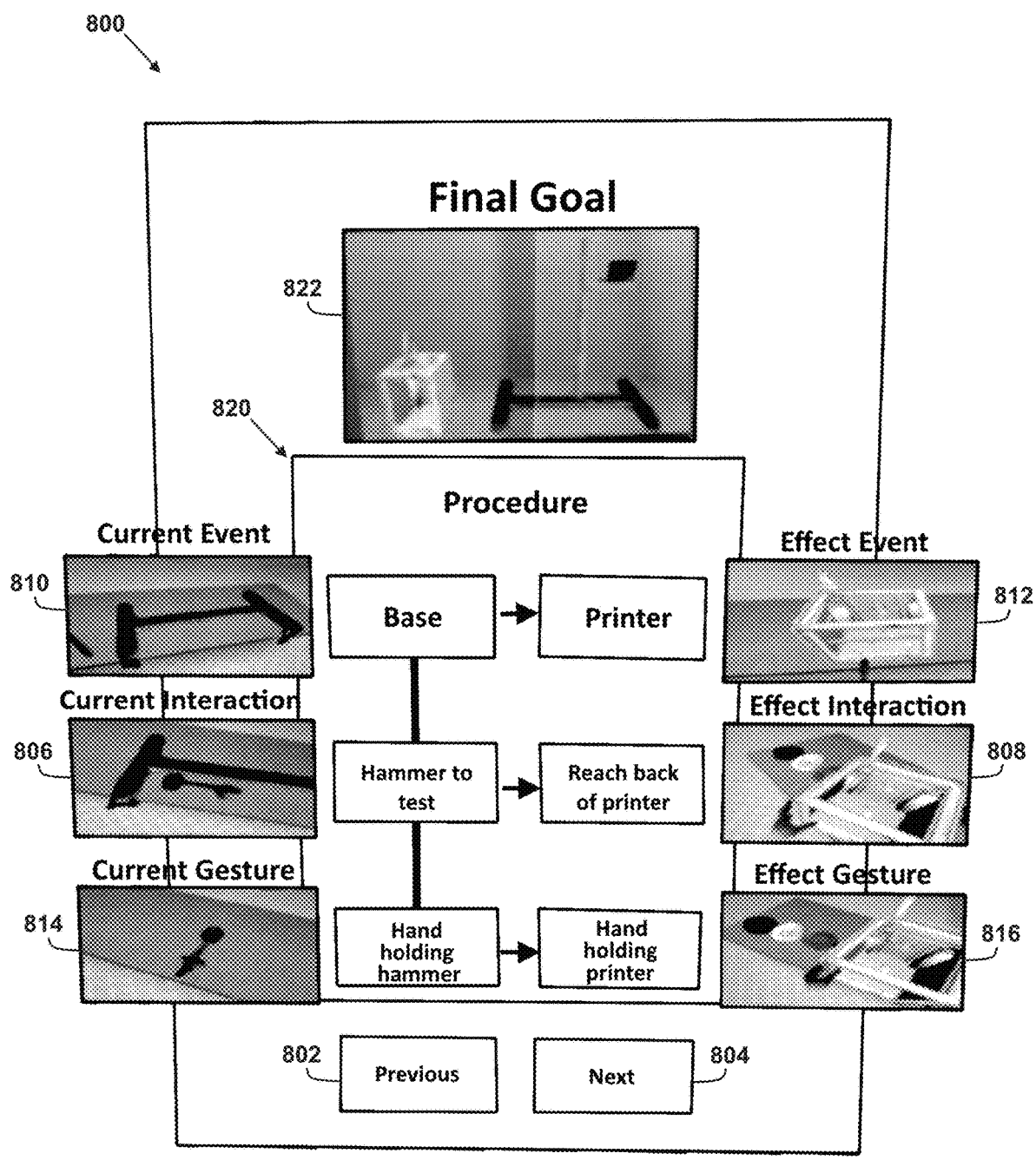
FIG. 9 shows an exemplary graphical user interface that may be displayed to the user during performance of a task.

The method 700 continues with determining a current step of the task that is being performed by the user (block 720). Particularly, the processor 25 determines a current step that is being performed by the user. In at least some embodiments, the processor 25 determines the current step that is being performed by the user based on user inputs. Particularly, the user may interact with a graphical user interface of the MR system 20 to provide user inputs to indicate which step he or she is currently performing. FIG. 9 shows an exemplary graphical user interface 800 of the MR system 20 that may be displayed to the user during performance of a task. In at least one embodiment, the graphical user interface 800 is an augmented reality and/or mixed reality graphical user interface that is superimposed on the user's view of the real-world environment. The graphical user interface 800 includes a previous step button 802 and a next step button 804, that can be interacted with by the user to navigate between steps of the plurality of steps.

However, it should be appreciated that, in some embodiments, the processor 25 may determine the current step that that is being performed by the user in an automated manner. Particularly, based on sensor data received from one or more of the sensors 24, 29, 30, the processor 25 monitors motions of the novice user and states of the real-world objects in the environment during a performance of the task by the novice user. Based on these motions of the novice user and states of the real-world objects, the processor 25 automatically determines the current step that is being performed by the user.

Returning to FIG. 8, the method 700 concludes with displaying an AR graphical user interface including graphical representations of (i) the current step to be performed by the user and (ii) at least one future step that has a causal relationship with the current step (block 730). Particularly, the processor 25 operates the display 28 of the MR-HMD 23 to display a graphical user interface, which is superimposed upon the real-world environment. The graphical user interface includes graphical instructional elements that convey information regarding the plurality of steps of the task and that are dynamically updated depending on the current step that is being performed by the user. In particular, the graphical instructional elements at least include a graphical representation of a current step being performed by a user and a graphical representation of at least one future step that has a causal relationship with the current step. Additionally, in some embodiments, the graphical instructional elements include a graphical depiction of at least part of the hierarchical causality graph that includes the current step. In this way, the user is provided with instructional information, not only for the current step, but also for future steps that are caused by the current step.

As discussed above, the graphical representations of each step may include an image of the step comprising a rendering of at least one of a virtual hand and a virtual object corresponding to the at least one real-world object. Similarly, in some embodiments, the graphical representations of each step may include an animation of the step that is animated according the corresponding segment of pose data from the recorded demonstration.

In at least some embodiments, the graphical user interface provides information for the current and future steps of the task at the event level, at the interaction level, and at the gesture level. In particular, at the interaction level, the graphical instructional elements include a first graphical representation of a current step (current interaction) being performed by a user and a second graphical representation of at least one future step (effect interaction) that has a causal relationship with the current step (current interaction). Additionally, at the event level, the graphical instructional elements include a third graphical representation of a current group of steps (current event) being performed by the user and a fourth graphical representation of at least one future group of steps (effect event) that has a causal relationship with the current group of steps (current event). Finally, at the gesture level, the graphical instructional elements include a fifth graphical representation of a current sub-step (current gesture) being performed by the user and a sixth graphical representation of at least one future sub-step (effect gesture) that has a causal relationship with the current sub-step (current gesture).

With reference again to FIG. 9, the graphical user interface 800 includes a first graphical illustration 806 of the current interaction (e.g., "Hammer to test") being performed by the user and a second graphical illustration 808 of a future effect interaction (e.g., "Reach back of printer") that is caused by the current interaction. Similarly, the graphical user interface 800 includes a third graphical illustration 810 of the current event (e.g., "Base") being performed by the user and a fourth graphical illustration 808 of a future effect event (e.g., "Printer") that is caused by the current event. Additionally, the graphical user interface 800 includes a fifth graphical illustration 814 of the current gesture (e.g., "Hand holding hammer") being performed by the user and a sixth graphical illustration 816 of a future effect gesture (e.g., "Hand holding printer") that is caused by the current event. The graphical user interface 800 further includes a graphical depiction 820 of at least part of the hierarchical causality graph that includes the current step. Finally, the graphical user interface 800 includes an illustration 822 of the final goal of the task. The graphical user interface 800 may be superimposed on a real-world environment of the user with aid of a mixed reality device and/or an augmented reality device (a device similar to the MR-HMD 23, discussed above).

Embodiments within the scope of the disclosure may also include non-transitory computer-readable storage media or machine-readable medium for carrying or having computer-executable instructions (also referred to as program instructions) or data structures stored thereon. Such non-transitory computer-readable storage media or machine-readable medium may be any available media that can be accessed by a general purpose or special purpose computer. By way of example, and not limitation, such non-transitory computer-readable storage media or machine-readable medium can comprise RAM, ROM, EEPROM, CD-ROM or other optical disk storage, magnetic disk storage or other magnetic storage devices, or any other medium which can be used to carry or store desired program code means in the form of computer-executable instructions or data structures. Combinations of the above should also be included within the scope of the non-transitory computer-readable storage media or machine-readable medium.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A method for generating instructional content, the method comprising:
   storing, in a memory, virtual models representing virtual hands and at least one virtual object;
   generating, with a processor, a sequence of pose data for the virtual hands and the at least one virtual object by recording, with at least one sensor, a demonstration by a user of a task within a real-world environment in which the user interacts with at least one real-world object corresponding to the at least one virtual object;
   segmenting, with the processor, the sequence of pose data with at least three levels of granularity to define (i) a plurality of segments of the sequence of pose data, each respective segment of the plurality of segments corresponding to a respective step of a plurality of steps of the task, (ii) a plurality of groups of segments from the plurality of segments, each group of segments corresponding to a respective group of steps from the plurality of steps, and (iii) a respective plurality of subsegments for each respective step of the plurality of steps, each subsegment corresponding to a sub-step of the respective step;
   defining, with the processor, (i) first causal relationships between steps of the plurality of steps of the task, (ii) second causal relationships between the groups of steps from the plurality of steps, and (iii) third causal relationships between the sub-steps of steps from the plurality of steps; and
   generating, with the processor, graphical content configured to be displayed in an augmented reality graphical user interface to instruct a further user how to perform the task, based on the segmented sequence of pose data and the defined causal relationships, the graphical content being generated by rendering the plurality of virtual models posed according to the sequence of pose data for the virtual hands and the at least one virtual object, the graphical content including (i) a plurality of first graphical depictions of each step from the plurality of steps, (ii) a plurality of second graphical depictions of each group of steps from the plurality of steps, and (iii) a plurality of third graphical depictions of each sub-step of each step from the plurality of steps.

2. The method according to claim 1, the defining the plurality of segments further comprising at least one of:
   defining the plurality of segments based on user inputs; and
   defining the plurality of groups of segments from the plurality of segments based on user inputs.

3. The method according to claim 1, the defining the plurality of segments further comprising:
   detecting, in the demonstration by the user of the task, interactions between hands of the user and the at least one real-world object; and
   defining the plurality of groups of segments automatically based on the detected interactions between the hands of the user and the at least one real-world object, each group of segments corresponding to multiple interactions between the hands of the user and the at least one real-world object.

4. The method according to claim 1, the defining the plurality of segments further comprising:
   detecting, in the demonstration by the user of the task, interactions between hands of the user and the at least one real-world object; and
   defining the plurality of segments automatically based on the detected interactions between the hands of the user and the at least one real-world object, each segment corresponding to a discrete interaction between the hands of the user and the at least one real-world object.

5. The method according to claim 1, the defining causal relationships comprising:
   generating a graph representation of the task including a plurality of first nodes and a plurality of first edges connecting nodes of the plurality of first nodes, each first node representing a respective step of the plurality of steps of the task, each respective first edge representing a causal relationship between steps represented by nodes connected by the respective first edge.

6. The method according to claim 5, wherein the graph representation is a hierarchical graph representation that further includes:
a plurality of second nodes and a plurality of second edges connecting nodes of the plurality of second nodes, each second node representing a respective group of steps from the plurality of steps, each respective second edge representing a causal relationship between groups of steps represented by nodes connected by the respective second edge; and
a plurality of third nodes and a plurality of third edges connecting nodes of the plurality of third nodes, each third node representing a sub-step of a corresponding step from the plurality of steps, each respective second edge representing a causal relationship between sub-steps represented by nodes connected by the respective third edge.

7. The method according to claim 5, wherein:
each step in the plurality of steps is a discrete interaction between the hands of the user and the at least one real-world object;
each group of steps from the plurality of steps represents a process necessary to complete the task that involves multiple discrete interactions between the hands of the user and the at least one real-world object; and
each sub-step of each respective step in the plurality of steps corresponds to a pose of at least one of (i) the virtual hands and (ii) the at least one virtual object that occurs during the discrete interaction corresponding to the respective step.

8. The method according to claim 1, the defining the causal relationships further comprising:
defining a causal relationship between two respective steps of the plurality of steps of the task automatically depending on at least one of (i) which object of the at least one object is involved in the two respective steps during the demonstration and (ii) a temporal order of the two respective steps during the demonstration.

9. A method for providing instructional guidance for performing a task, the method comprising:
storing, in a memory, instructional data defining the task with at least two levels of granularity including (i) a plurality of steps of a task and causal relationships between steps of the plurality of steps of the task and (ii) groups of steps from the plurality of steps and causal relationships between the groups of steps from the plurality of steps, the plurality of steps including interactions with at least one real-world object in a real-world environment;
determining, with a processor, a current step that is being performed by a user by recording, with at least one sensor, a performance by the user of the task within the real-world environment; and
displaying, on a display, an augmented reality graphical user interface including graphical instructional elements that convey information regarding the plurality of steps of the task and that are superimposed on the real-world environment, the graphical instructional elements including:
(i) a first graphical depiction of the current step of the plurality of steps being performed by a user;
(ii) a second graphical depiction of at least one future step of the plurality of steps that has a causal relationship with the current step;
(iii) a third graphical depiction of a current group of steps of the plurality of steps being performed by the user; and
(iv) a fourth graphical depiction of at least one future group of steps of the plurality of steps that has a causal relationship with the current group of steps,
wherein the first graphical depiction, the second graphical depiction, the third graphical depiction, and the fourth graphical depiction are displayed simultaneously with one another in the augmented reality graphical user interface, and
wherein the augmented reality graphical user interface is automatically updated depending on the current step that is being performed by the user.

10. The method according to claim 9, wherein the instructional data includes a graph representation of the task including a plurality of first nodes and a plurality of first edges connecting nodes of the plurality of first nodes, each first node representing a respective step of the plurality of steps of the task, each respective first edge representing a causal relationship between steps represented by nodes connected by the respective first edge.

11. The method according to claim 10, wherein the graph representation is a hierarchical graph representation that further includes:
a plurality of second nodes and a plurality of second edges connecting nodes of the plurality of second nodes, each second node representing a respective group of steps from the plurality of steps, each respective second edge representing a causal relationship between groups of steps represented by nodes connected by the respective second edge; and
a plurality of third nodes and a plurality of third edges connecting nodes of the plurality of third nodes, each third node representing a sub-step of a corresponding step from the plurality of steps, each respective second edge representing a causal relationship between sub-steps represented by nodes connected by the respective third edge.

12. The method according to claim 9, wherein:
the instructional data further defines sub-steps of steps in the plurality of steps and causal relationships between the sub-steps of steps from the plurality of steps; and
the graphical instructional elements in the augmented reality user interface further include (i) a fifth graphical depiction of a current sub-step of a current step of the plurality of steps being performed by the user and (ii) a sixth graphical depiction of at least one future sub-step of a step of the plurality of steps that has a causal relationship with the current sub-step, the fifth graphical depiction being displayed simultaneously with the sixth graphical depiction.

13. The method according to claim 12, wherein:
each step in the plurality of steps is a discrete interaction between hands of the user and the at least one real-world object;
each group of steps from the plurality of steps represents a process necessary to complete the task that involves multiple discrete interactions between the hands of the user and the at least one real-world object; and
each sub-step of each respective step in the plurality of steps corresponds to a pose of at least one of (i) virtual hands and (ii) the at least one virtual object that occurs during the discrete interaction corresponding to the respective step.

14. The method according to claim 9, wherein:
the instructional data includes a sequence of pose data for virtual hands and at least one virtual object corresponding to the at least one real-world object;
the first graphical depiction includes an animation of the current step, the animation being generated based on a segment of pose data from the sequence of pose data that corresponds to the current step; and
the second graphical depiction includes an animation of the at least one future step, the animation being generated based on a segment of pose data from the sequence of pose data that corresponds to the at least one future step.

15. The method according to claim 9, wherein at least one of:
the first graphical depiction includes an image of the current step having a rendering of at least one of a virtual hand and a virtual object corresponding to the at least one real-world object; and
the second graphical depiction includes an image of the at least one future step having a rendering of at least one of the virtual hand and the virtual object corresponding to the at least one real-world object.

* * * * *